(12) United States Patent
Obkircher

(10) Patent No.: US 8,135,881 B1
(45) Date of Patent: Mar. 13, 2012

(54) DYNAMICALLY CONFIGURABLE SERIAL DATA COMMUNICATION INTERFACE

(75) Inventor: Thomas Obkircher, Tustin, CA (US)

(73) Assignee: Skyworks Solutions, Inc., Woburn, MA (US)

( * ) Notice: Subject to any disclaimer, the term of this patent is extended or adjusted under 35 U.S.C. 154(b) by 0 days.

(21) Appl. No.: 12/891,513

(22) Filed: Sep. 27, 2010

(51) Int. Cl.
*G06F 13/14* (2006.01)
(52) U.S. Cl. .............................. 710/37; 710/3
(58) Field of Classification Search .................. None
See application file for complete search history.

(56) References Cited

U.S. PATENT DOCUMENTS

| | | | | |
|---|---|---|---|---|
| 7,000,056 | B2 * | 2/2006 | Poisner | 710/305 |
| 7,761,633 | B2 * | 7/2010 | Devila et al. | 710/110 |
| 7,769,909 | B2 * | 8/2010 | Ho et al. | 710/5 |
| 2008/0005434 | A1 * | 1/2008 | Lee et al. | 710/110 |
| 2008/0235428 | A1 * | 9/2008 | Yu et al. | 710/309 |
| 2010/0138576 | A1 * | 6/2010 | Goerlich et al. | 710/110 |
| 2011/0153888 | A1 * | 6/2011 | Sun et al. | 710/107 |

* cited by examiner

*Primary Examiner* — Cheng-Yuan Tseng
(74) *Attorney, Agent, or Firm* — Knobbe Martens Olson & Bear, LLP

(57) ABSTRACT

A serial peripheral interface (SPI) controller can be configured in response to data received via the interface. The SPI controller can perform read and write operations upon registers of a register bank in response to signals received via one or more of a data signal line, a clock signal line, and a select signal line. By detecting combinations of signals on one or more of the data signal line, clock signal line and select signal line, the SPI controller can detect the initiation of data read and write operations that may be in accordance with any of several different SPI protocols.

32 Claims, 22 Drawing Sheets

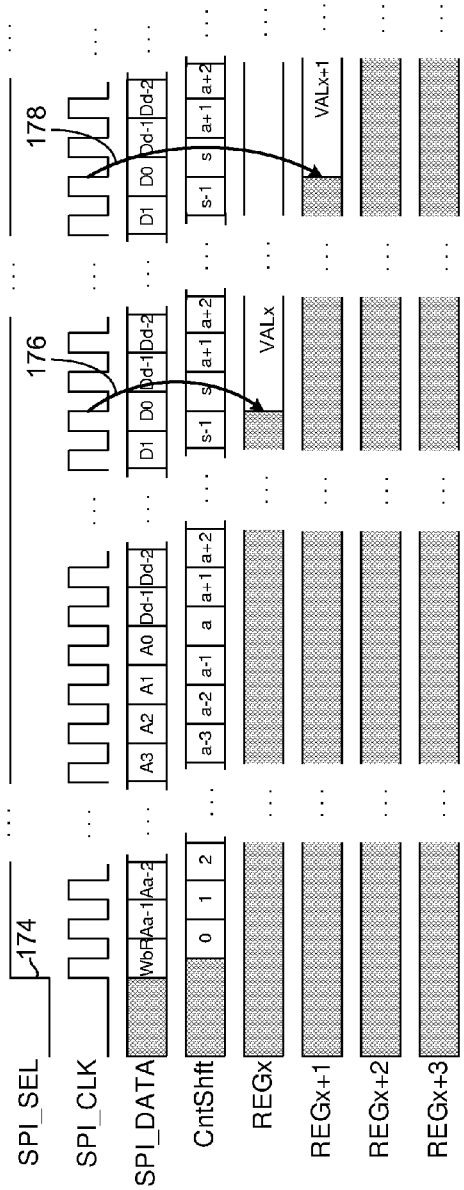
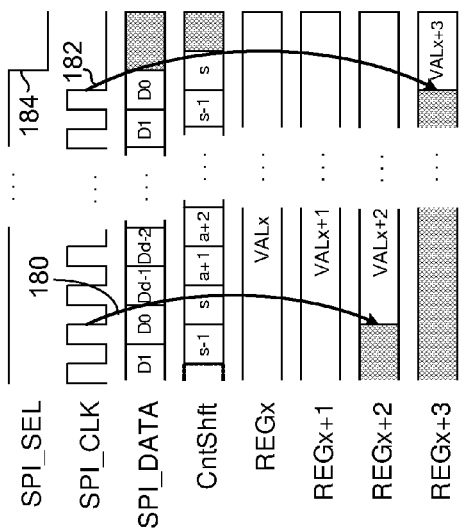
FIG. 19A
FIG. 19B

| | [15] | [14] | [13] | [12] | [11] | [10] | [9] | [8] | [7] | [6] | [5] | [4] | [3] | [2] | [1] | [0] |
|---|---|---|---|---|---|---|---|---|---|---|---|---|---|---|---|---|
| REG0 | Clr Reg | LenID | | Sel Bit Ord | Sel Wrd Ord | CtrlTrn | | | CtrlAddr | | | | CtrlData | | Sel Ltch | Sel Clk |
| REG1 | | | | | | Hard Device ID | | | | | | | Soft Device ID | | | |
| REG2 | | | | | | | | | | | | | | | | |
| REGj | | | | | | | | | | | | | | | | |

FIG. 27

DYNAMICALLY CONFIGURABLE SERIAL DATA COMMUNICATION INTERFACE

BACKGROUND

A serial data communication interface comprises a data bus operating in accordance with a data communication protocol to transfer data serially, i.e., one bit at a time, from one device to another. A well known family of serial data communication interfaces, sometimes referred to as Serial Peripheral Interface or SPI, includes at least three signal lines: Data, Clock and Select. Although these signal lines are commonly referred to as Data, Clock and Select, alternative names, such as Enable instead of Select, are also used. Various types of serial data communication interfaces having so-called "4-wire," "3-wire," "2-wire" and even "1-wire" data buses are known, where the term "wire" is a colloquial reference to a signal line. In actuality, the signal line may be a wire, a printed circuit board trace, an optical fiber, or other such single-channel signal-carrying medium. The term "Serial Peripheral Interface" or "SPI" is commonly used to refer to a 3-wire interface having a bidirectional Data line along with the Clock and Select lines, although in some instances the term has been used to refer to a 4-wire interface having two unidirectional Data lines along with the Clock and Select lines. Some SPI busses also include a Reset line.

The SPI is commonly used in electronic systems in which a relatively complex digital subsystem, such as one having a microprocessor, controls aspects of the operation of a peripheral device or other subsystem that is more basic or otherwise different from the controlling digital subsystem. For example, some digital subsystems use a SPI to control another subsystem that primarily comprises analog circuitry, such as radio frequency (RF) circuitry. As illustrated in FIG. 1, a mobile telephone handset 10 commonly comprises an RF subsystem 12 that includes radio transceiver circuitry, a baseband subsystem 14 that includes a microprocessor or similar circuitry for controlling the overall functionality of the handset, and a user interface 16 that includes a microphone, speaker, display, keypad, etc. The RF subsystem 12 receives, downconverts, and demodulates RF signals received through an antenna 18 and provides the demodulated signal 20 in digital form to baseband subsystem 14. Conversely, RF subsystem 12 receives digital signals 22 from baseband subsystem 14, modulates and upconverts them to RF for transmission, and provides the RF signals to antenna 18. Baseband subsystem 14 can modify various operating parameters of RF subsystem 12, such as transmission power levels and modulation modes, by sending instructions to RF subsystem 12 via an SPI bus 24. Baseband subsystem 14 can send such instructions to RF subsystem 12 by performing write operations on SPI bus 24 under control of an SPI controller (not shown in FIG. 1) in baseband subsystem 14.

As illustrated in FIG. 2, the above-referenced SPI controller is commonly referred to as an SPI "master" controller 26 because it is common to control two or more devices or two or more blocks of circuitry within a device. For example, RF subsystem 12 can include two or more RF integrated circuit (IC) chips 28, 30, etc., each of which can be individually controlled by SPI master controller 26. Each of RF IC chips 28, 30, etc., includes a corresponding SPI slave controller 32, 34, etc., that responds to the read and write operations initiated by SPI master controller 26. Each of SPI slave controllers 32, 34, etc., has a unique device identifier associated with it that allows SPI master controller 26 to address it on SPI bus 24. Accordingly, SPI master controller 26 controls the state of the Select signal line and Clock signal line on SPI bus 24 and also controls the state of the Data signal line during write operations. During read operations, the one of SPI slave controllers 32, 34, etc., being read from controls the state of the Data signal line. As described in further detail below with regard to timing diagrams illustrating several SPI protocols, in a data write or data read operation successive data bits are sent in serial format on the Data signal line in synchronism with successive cycles of the Clock signal. In accordance with each of the SPI protocols described below, the Clock signal is activated or asserted during the write or read operation and deactivate or de-asserted when no write or read operation is occurring. Although not shown in FIGS. 1-2, each of SPI slave controllers 32, 34, etc., interfaces with other circuitry, such as the aforementioned controllable analog circuitry, in its respective RF IC chip 28, 30, etc.

Several types of well-known SPI protocols are illustrated by means of the timing diagrams of FIGS. 3-8. As illustrated in FIGS. 3-4, in accordance with one such protocol, a SPI master controller (not shown) of the type described above with regard to FIG. 2 can cause Select to transition from a low logic state or logic-"0" to a high logic state or logic-"1" to indicate a data transfer. The SPI master controller also activates the Clock signal. In some instances a SPI master controller may activate the Clock signal before transitioning the Select signal, and in other instances a SPI master controller may activate the Clock signal after transitioning the Select signal, as indicated by the initial Clock cycle shown in broken line. A SPI protocol in which a data transfer operation begins with Select transitioning from low to high can be referred to as an "active-high select" type of SPI protocol. As illustrated in FIG. 3, the SPI master controller causes the first bit on the Data signal line following the transition of Select from low to a high to be a "0" to indicate that the operation is a write operation. (The label "WbR," which is equivalent to " $\overline{\text{Write}}$/Read" or "Write_bar/Read," is used in FIG. 3 and similar drawing figures herein to indicate this Write/Read bit.) On each of the next "a" clock cycles following that "0" or write-indicating bit, the SPI master controller can send one address bit ("Aa-1" through "A0"). Then, on each of the next "d" clock cycles following the address bits, the SPI master controller can send one data bit ("Dd-1" through "D0"). Following the transfer of the last data bit D0, the SPI master controller 26 causes Select to transition from high back to low. The number "a" of address bits and the number "d" of data bits are typically fixed or predetermined. That is, during every write operation, the SPI master controller sends the same number "a" of address bits and the same number "d" of data bits as it does during every other write operation. In response to the address and data information, and in accordance with the timing of the transitions of Select and Clock, the one SPI slave controller identified by the address bits (or a portion of the address bits) writes the data to a register (not shown).

As illustrated in FIG. 4, the SPI master controller can cause the first bit on the Data signal line following the transition of Select from a low logic state to a high logic state to be a "1" to indicate that the operation is a read operation. On each of the next "a" clock cycles following that "1" or read-indicating bit, the SPI master controller can send one address bit ("Aa-1" through "A0"). Following the transfer of the last address bit A0, the SPI master controller causes Select to transition from high back to low. Then, after a delay of one or more clock cycles that is commonly referred to as a "turn-around time" or "turn-around length," the SPI slave controller identified by those address bits (or a portion thereof) can read data bits from a register or similar source and send one data bit ("Dd-1" through "D0") to the SPI master controller on each of "d" clock cycles.

As illustrated in FIGS. 5-6, in accordance with another such protocol, another SPI master controller (not shown) that is generally of the type described above with regard to FIG. 2 can cause Select to transition from high to low to indicate a data transfer. A SPI protocol in which a data transfer operation begins with Select transitioning from high to low can be referred to as an "active-low select" type of SPI protocol.

As illustrated in FIG. 5, the SPI master controller causes the first bit on the Data signal line following the transition of Select from high to low to be a "0" to indicate that the operation is a write operation. On each of the next "a" clock cycles following that "0" or write-indicating bit, SPI master controller 26 can send one address bit ("Aa-1" through "A0"). Then, on each of the next "d" clock cycles following the address bits, the SPI master controller can send one data bit ("Dd-1" through "D0"). Following the transfer of the last data bit D0, the SPI master controller causes Select to transition from a low logic state back to a high logic state. As in the above-described active-high select protocol, the number "a" of address bits and number "d" of data bits are typically fixed or predetermined. In response to the address and data information, and in accordance with the timing of the transitions of Select and Clock, the SPI slave controller identified by the address bits (or a portion of the address bits) writes the data to a register.

As illustrated in FIG. 6, SPI master controller 26 can cause the first bit on the Data signal line following the transition of Select from high to low to be a "1" to indicate that the operation is a read operation. On each of the next "a" clock cycles following that "1" or read-indicating bit, the SPI master controller can send one address bit ("Aa-1" through "A0"). Following the transfer of the last address bit A0, the SPI master controller causes Select to transition from a low logic state back to a high logic state. Then, after a delay of one or more clock cycles (i.e., the turn-around time), the SPI slave controller identified by those address bits (or a portion thereof) can read data bits from a register or similar source and send one data bit ("Dd-1" through "D0") to the SPI master controller on each of "d" clock cycles.

As illustrated in FIGS. 7-8, in accordance with still another such protocol, still another SPI master controller (not shown) that is generally of the type described above with regard to FIG. 2 can initiate a data transfer without using Select. One such protocol is commonly known as "Inter-Integrated Circuit or "I²C." Because the I²C protocol does not use Select, the I²C protocol is sometimes referred to as a 2-wire protocol rather than a 3-wire protocol. Although I²C is sometimes described as a separate protocol from SPI, I²C is referred to herein along with the above-described active-high select and active-low select protocols as another type of SPI protocol.

As illustrated in FIG. 7, to indicate the beginning of a data transfer under the I²C protocol, the SPI master controller first causes Data to transition from high to low while Clock is high. Then, to indicate that the data transfer operation is a write operation the SPI master controller holds the Data signal line low (logic-"0") during the next rising edge of Clock. On each of the next "a" clock cycles following that "0" or write-indicating bit, SPI master controller 26 can send one address bit ("Aa-1" through "A0"). Then, on each of the next "d" clock cycles following the address bits, the SPI master controller can send one data bit ("Dd-1" through "D0"). As in the other protocols described above, the number "a" of address bits and number "d" of data bits are typically fixed or predetermined. The SPI master controller can indicate the end of the data transfer by holding Clock high while causing Data to transition from low to high. In response to the address and data information, and in accordance with the timing of the transitions of Data and Clock, the SPI slave controller identified by the address bits (or a portion of the address bits) writes the data to a register.

As illustrated in FIG. 8, to indicate the beginning of a data transfer under the I²C protocol, the SPI master controller first causes Data to transition from high to low while Clock is high. Then, to indicate that the data transfer operation is a read operation the SPI master controller holds the Data signal line high (logic-"1") during the next rising edge of Clock. On each of the next "a" clock cycles following that "1" or read-indicating bit, SPI master controller 26 can send one address bit ("Aa-1" through "A0"). Then, after a delay of one or more clock cycles (i.e., the turn-around time), the SPI slave controller identified by those address bits (or a portion thereof) can read data bits from a register or similar source and send one data bit ("Dd-1" through "D0") to the SPI master controller on each of "d" clock cycles. The SPI master controller can indicate the end of the data transfer by holding Clock high while causing Data to transition from low to high.

In a system in which, for example, SPI slave controller 32 operates in accordance with a first one of the above-described SPI protocols but SPI slave controller 34 operates in accordance with a second one of the above-described SPI protocols, SPI master controller 26 must be capable of switching between the two protocols, i.e., using the first protocol to communicate data with SPI slave controller 32 and using the second protocol to communicate data with SPI slave controller 34. Providing a master controller 26 that operates in accordance with several different protocols can introduce a number of inefficiencies for system manufacturers. Also, providing an RF subsystem 12 that integrates multiple slave controllers operating in accordance with different protocols can be similarly inefficient. It is possible to signal a SPI slave controller circuitry to operate in accordance with a selected SPI protocol by supplying a protocol mode control signal to a mode select pin or similar input on an integrated circuit chip having such a protocol mode select feature. However, dedicating a pin to a protocol mode control signal is wasteful of input/output resources.

SUMMARY

Embodiments of the present invention relate to a serial peripheral interface (SPI) controller that can be configured in response to data received via the interface. The SPI controller can perform read and write operations upon registers of a register bank in response to signals received via one or more of a data signal line, a clock signal line, and a select signal line. By detecting combinations of signals on one or more of the data signal line, clock signal line and select signal line, the SPI controller can detect the initiation of data read and write operations. Different combinations of signals can indicate to the SPI controller the type of SPI protocol with which the data read or data write operation is in accordance, thereby allowing the SPI controller to respond to the initiation of the data read and write operations regardless of which of the two or more SPI protocols is used. Accordingly, when the SPI controller detects the initiation of a data read or data write operation, the SPI controller controls the performance of a corresponding data read or data write operation upon a register identified by the address bits that are received serially on the data signal line.

Other systems, methods, features, and advantages of the invention will be or become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE FIGURES

The components within the figures are not necessarily to scale, emphasis instead being placed upon clearly illustrating the principles of the invention. Moreover, in the figures, like reference numerals designate corresponding parts throughout the different views.

FIG. 19A is a timing diagram illustrating a data write operation in a compressed mode, in the SPI system of FIG. 9.

FIG. 19B is a continuation of FIG. 19A.

FIG. 27 is a memory map of the contents of the register bank of the SPI system of FIG. 9.

DETAILED DESCRIPTION

Figure 1:
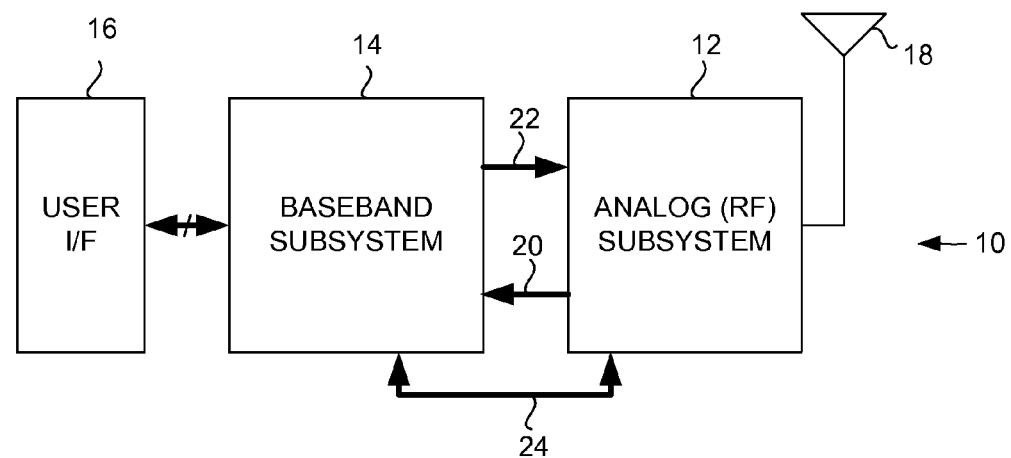
FIG. 1 is a block diagram illustrating a mobile wireless telephone having a serial peripheral interface (SPI) for controlling a radio frequency subsystem, in accordance with the prior art.
Figure 2:
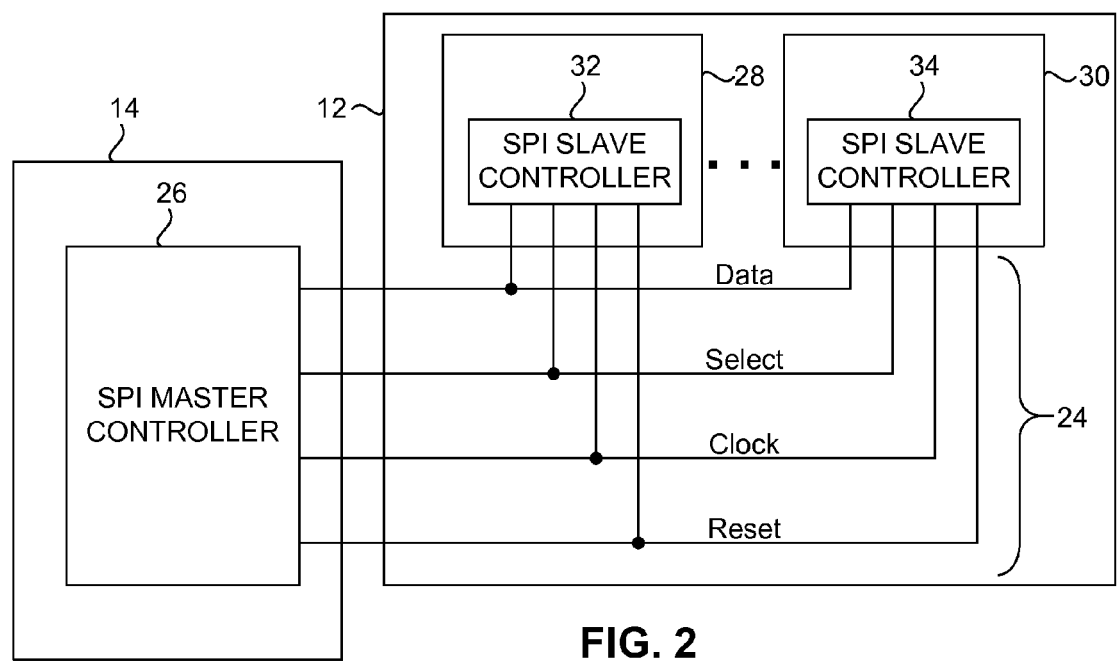
FIG. 2 is a block diagram of a multi-device system having a SPI in accordance with the prior art.
Figure 3:
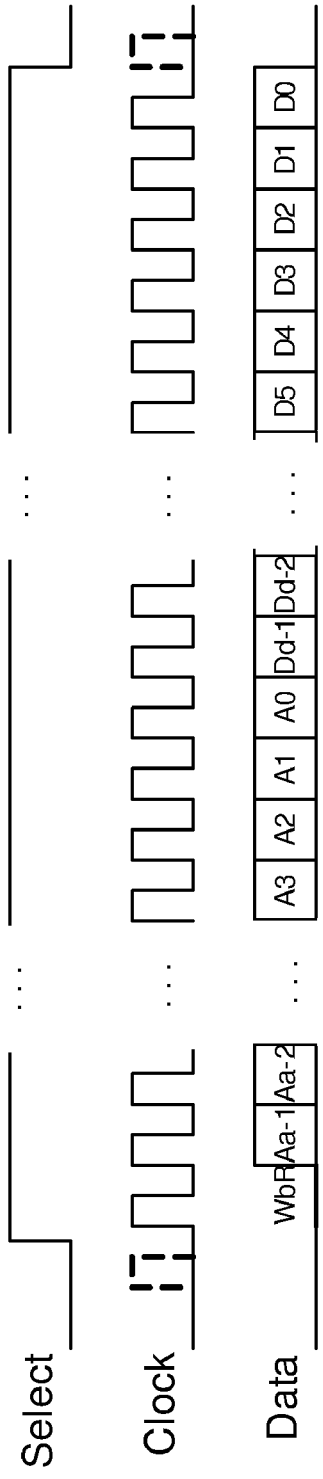
FIG. 3 is a timing diagram illustrating a data write operation in accordance with an active-high select SPI protocol, in accordance with the prior art.
Figure 4:
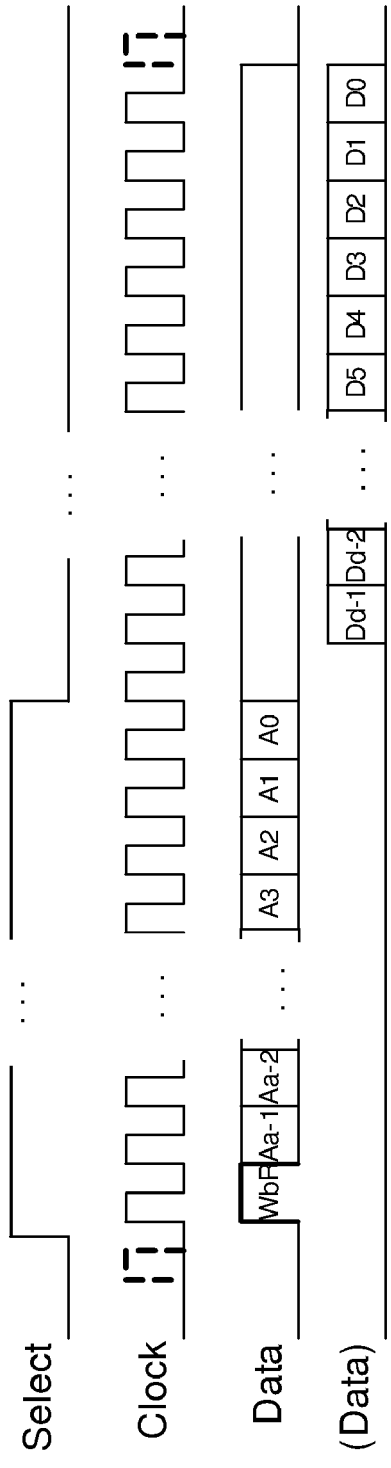
FIG. 4 is a timing diagram illustrating a data read operation in accordance with an active-high select SPI protocol, in accordance with the prior art.
Figure 5:
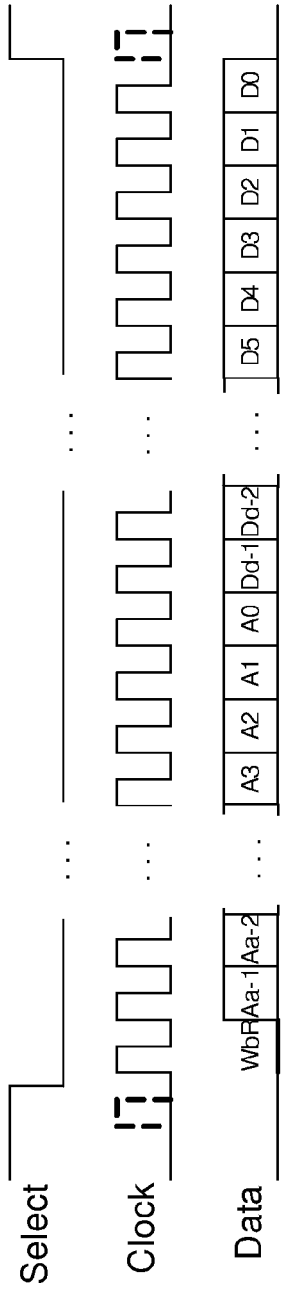
FIG. 5 is a timing diagram illustrating a data write operation in accordance with an active-low select SPI protocol, in accordance with the prior art.
Figure 6:
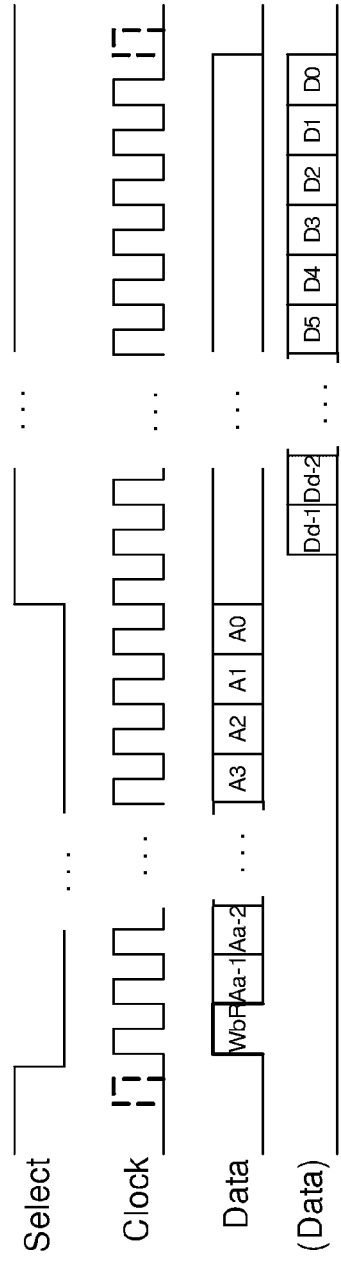
FIG. 6 is a timing diagram illustrating a data read operation in accordance with an active-low select SPI protocol, in accordance with the prior art.
Figure 7:
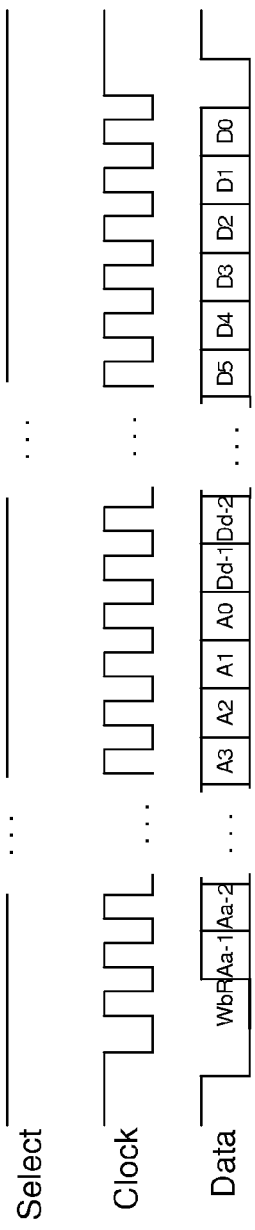
FIG. 7 is a timing diagram illustrating a data write operation in accordance with an I²C SPI protocol, in accordance with the prior art.
Figure 8:
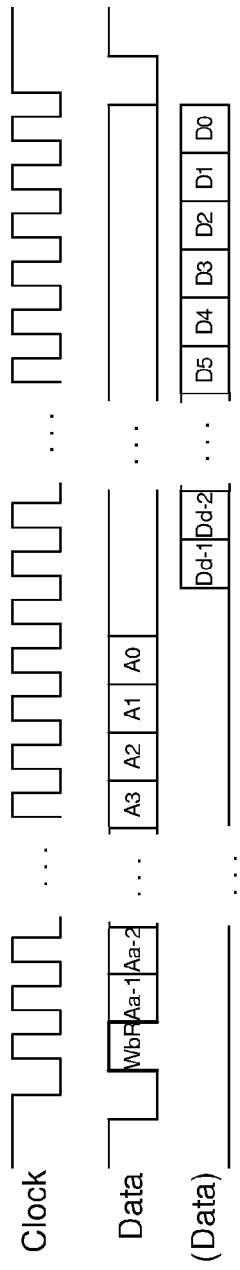
FIG. 8 is a timing diagram illustrating a data read operation in accordance with an I²C SPI protocol, in accordance with the prior art.
Figure 9:
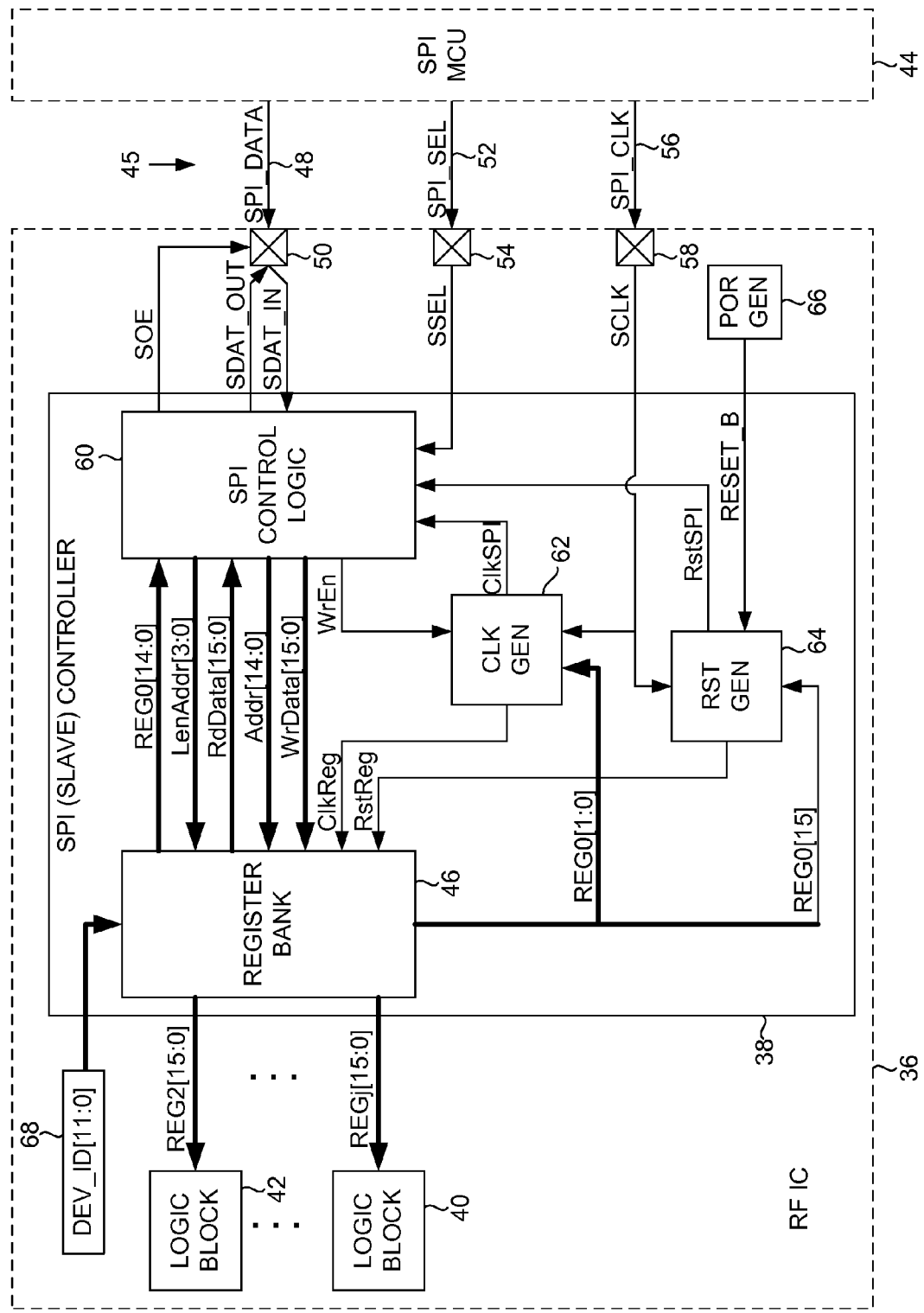
FIG. 9 is a block diagram of a SPI system in accordance with an exemplary embodiment of the present invention.

As illustrated in FIG. 9, in an illustrative or exemplary embodiment of the invention, an integrated circuit (IC) chip 36 includes a serial peripheral interface (SPI) slave controller 38. The IC chip 36 can be similar to above-described conventional RF IC chips 28, 30, etc., except that IC chip 36 includes SPI slave controller 38 in accordance with the exemplary embodiment of the present invention. Accordingly, IC chip 36 has controllable RF circuitry (not shown for purposes of clarity) and a number of logic blocks 40, 42, etc., which digitally provide the control signals to the controllable (analog) RF circuitry. (Note that only two logic blocks 40 and 42 are shown for purposes of clarity, with the logic blocks that are not shown being indicated by the ellipsis (" . . . ") symbol.) Although the exemplary embodiment includes a plurality of logic blocks 40, 42, etc., other embodiments can have as few as a single such logic block. (In the exemplary embodiment, there are j+1 logic blocks, where j is a nonzero integer.) Also, although only a single IC chip 36 is shown herein for purposes of clarity, a system of two or more such IC chips, each having a SPI slave controller, can be provided.

To control the RF circuitry of IC chip 36, an SPI master controller 44 can initiate a write operation in which SPI master controller 44 transmits data via SPI bus 45 to SPI slave controller 38, which writes the data to a register of a register bank 46. The data that has been written to or latched into the registers is provided to logic blocks 40, 42, etc., in the form of a parallel or multiple-bit data word. For example, a 16-bit data word, REGj[15:0], is provided to the jth logic block 40. A signal name notation that is used throughout the drawing figures to refer to such parallel data words has the form: "X[A:B]," where X is the signal name, A is the index of the most-significant bit, and B is the index of the least-significant bit. SPI master controller 44 can also initiate a read operation, to which SPI slave controller 38 responds by reading data from a register of register bank 46 and transmitting the data to SPI master controller 44 via SPI bus 45.

The SPI bus 45 between SPI master controller 44 and SPI slave controller 38 includes a data signal line 48 (SPI_DATA) that is connectable to a first pin 50 of integrated circuit chip 36, a select signal line 52 (SPI_SEL) that is connectable to a second pin 54 of integrated circuit chip 36, and a clock signal line 56 (SPI_CLK) that is connectable to a third pin 58 of IC chip 36. SPI slave controller 38 also includes SPI control logic 60, a clock signal generator 62, and a reset generator 64. SPI control logic 60 can receive a serial data signal SDAT_IN from first pin 50 and send serial data signal SDAT_OUT to first pin 50. SPI control logic 60 generates a serial output enable signal SOE that controls the direction of data flow through first pin 50. The SPI control logic 60 also receives the select signal SSEL via second pin 54. SPI control logic 60 provides a number of signals to register bank 46: an address Addr[14:0], write data WrData[15:0], and an address length LenAdr[3:0]. SPI control logic 60 also receives signals from register bank 46: the data word stored in a register having an index "0" or REG0[14:0], and read data RdData[15:0]. SPI control logic 60 is described in further detail below.

Register bank 46 also receives a device identifier 68 (DEV_ID[11:0]) that uniquely identifies IC chip 36. That is, in a system having two or more IC chips (not shown), the device identifier ("device ID") of each chip is different from the device ID of all other chips in the system. SPI master controller 44 can thus use the device ID as part of an address in read or write operations directed to that chip, as described in further detail below. The device ID can be, for example, hard-wired into the logic of IC chip 36. Although in the exemplary embodiment the device ID is 12 bits in length, in other embodiments a device ID can be any other suitable length.

Clock signal generator 62 receives a clock signal SCLK via third pin 58, receives a write enable signal WrEn from SPI control logic 60, and receives the two least-significant bits of the contents of REG0 or REG0[1:0]. As described in further detail below, REG0 is used as an interface configuration register to store information that indicates various modes of SPI operation. Clock signal generator 62 generates a clock register signal ClkReg that it provides to register bank 46 and a clock SPI signal ClkSPI that it provides to SPI control logic 60. Clock signal generator 62 is described in further detail below.

Reset generator 64 receives an active-low hard reset signal RESET_B from a power-on reset (POR) signal generator 66. In the exemplary embodiment, POR signal generator 66 is not part of SPI slave controller 38 but rather is the part of IC chip 36 that provides a reset signal to other circuitry in IC chip 36 when power is first applied to IC chip 36, such as when a mobile telephone handset (not shown) in which IC chip 36 is included is turned on by a user. Reset generator 64 also receives the clock signal SCLK and one bit (REG0[15]) of the configuration word stored in the interface configuration register. Reset generator 64 generates a register reset signal RstReg that it provides to register bank 46 and a SPI reset signal RstSPI that it provides to SPI control logic 60. Reset generator 64 is described in further detail below.

Figure 10:
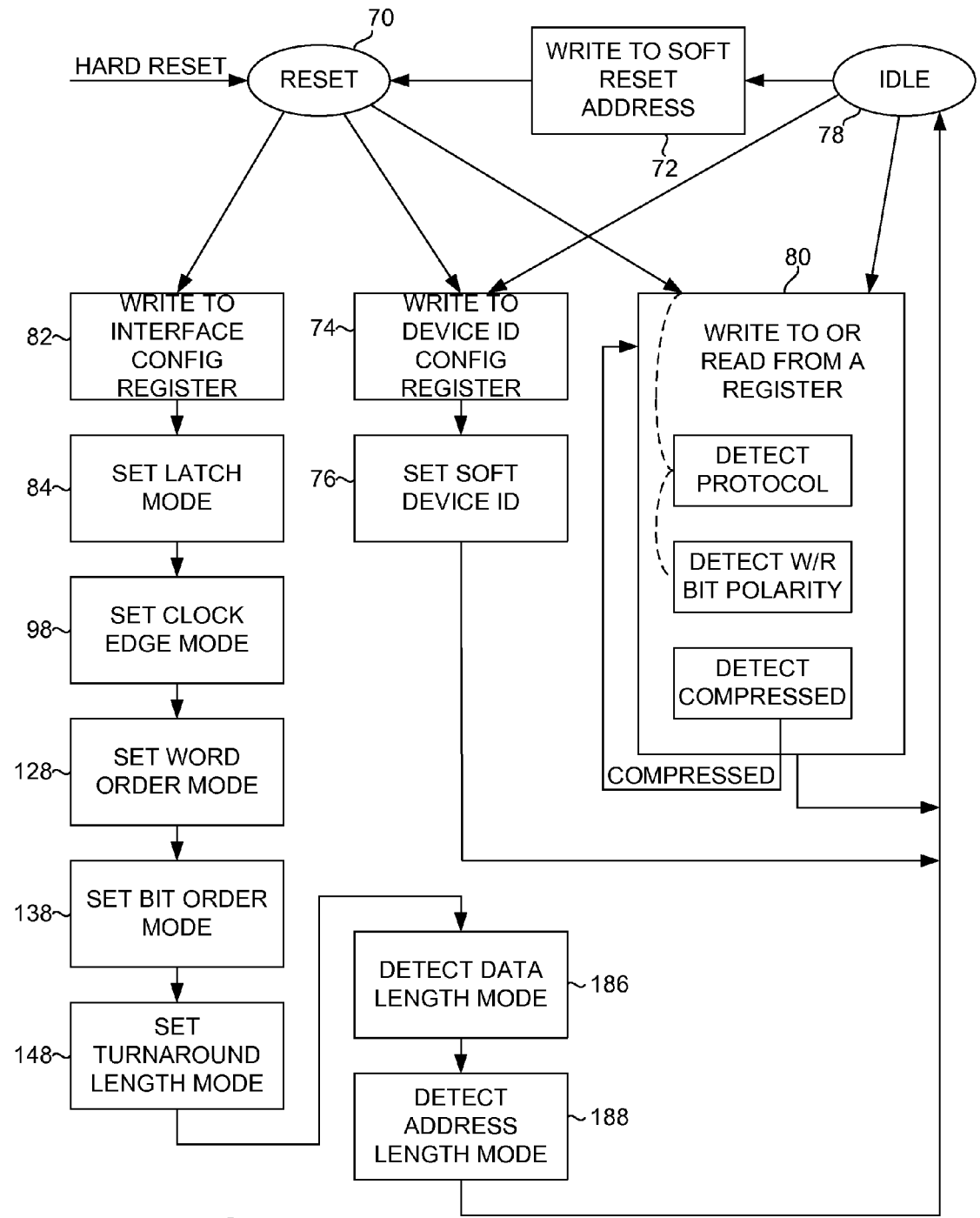
FIG. 10 is a flow diagram illustrating a method operation of the SPI system of FIG. 9.

SPI slave controller 38 can operate in accordance with the exemplary flow diagram of FIG. 10. In FIG. 10, the blocks represent actions, states, etc., that occur in the operation of SPI slave controller 38. Although the blocks are shown in a certain order or sequence in FIG. 10 for purposes of clarity, the actions may occur in an order or sequence different from that shown in FIG. 10. The actual order or sequence in which the actions occur is in accordance with the digital logic of SPI slave controller 38, which is described below. For example, in instances in which logic elements of SPI slave controller 38 relating to such actions operate in parallel with each other, some of the actions or portions of actions may occur in parallel with others.

As illustrated in FIG. 10, in response to a hard reset signal (RESET_B), SPI slave controller 38 enters a reset state, indicated by block 70. As indicated by block 72, SPI slave controller 38 can also enter the reset state (block 70) in response to a write operation to a reserved address initiated by SPI master controller 44. Entering the reset state in response to such a write operation can be referred to as a soft reset. The reset state represents a state or condition in which the various digital logic elements of SPI slave controller 38 assume an initial state.

As indicated by block 74, SPI master controller 44 can configure or set a soft device ID in any of one or more SPI slave controllers that can be used instead of, i.e., as an alias for, the above-referenced device identifier 68 (DEV_ID[11:0]). For example, a 4-bit soft device identifier (ID) can be assigned to integrated circuit chip 36 that can be used instead of the 12-bit device identifier 68, thus economizing on the number of address bits that SPI master controller 44 needs to send in subsequent read and write operations. To set the soft device ID, SPI master controller 44 initiates a write operation upon a device ID configuration register. The device ID configuration register can be, for example, a register having an index of "1" (REG1) in register bank 46 of SPI slave controller 38. A diagram or map illustrating the bit assignments of the device ID configuration register (REG1) in register bank 46 is shown in FIG. 27.

Figure 17A:
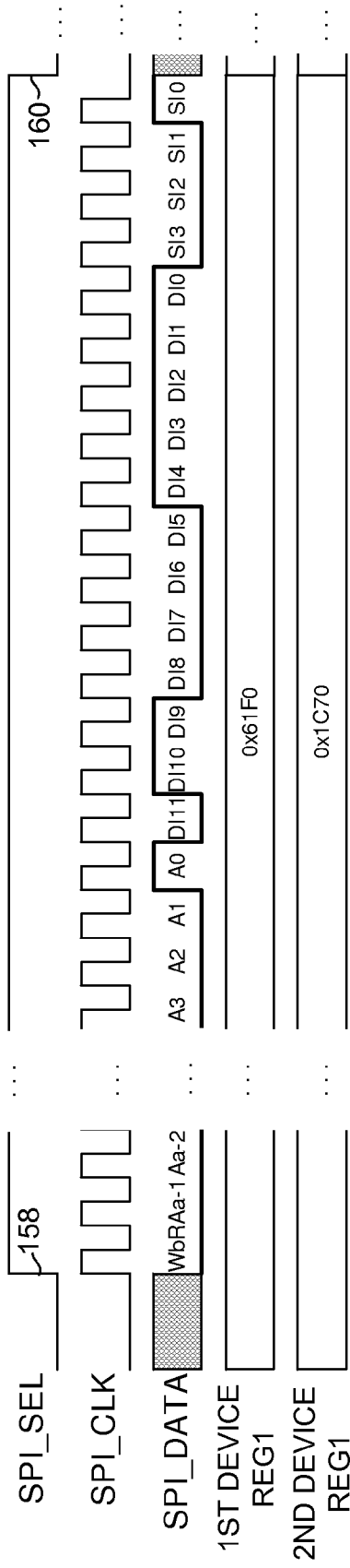
FIG. 17A is a timing diagram illustrating configuring a soft device ID, in the SPI system of FIG. 9.
Figure 17B:
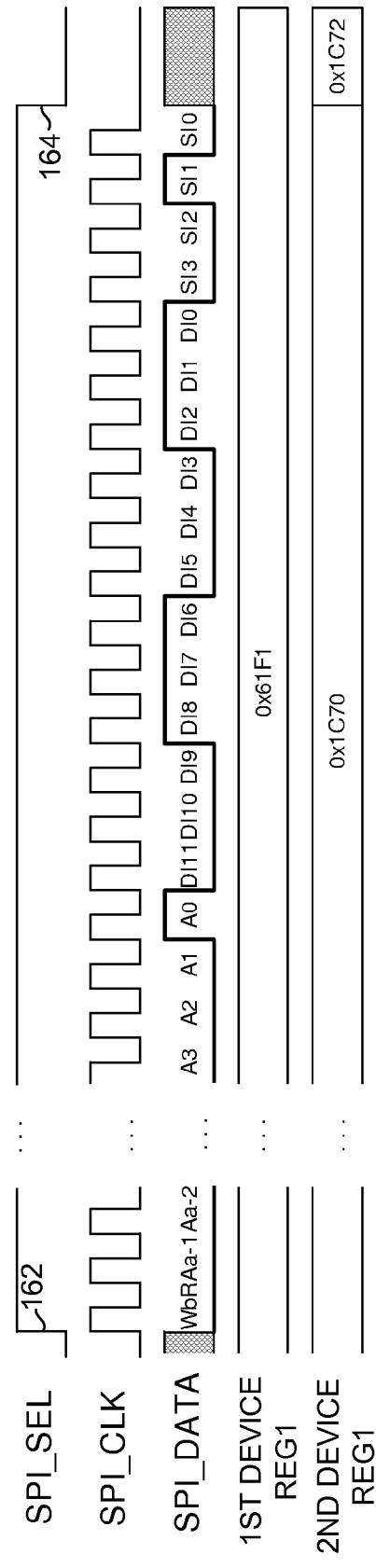
FIG. 17B is a continuation of FIG. 17A.

As indicated by block 76, SPI slave controller 38 responds to the write operation to the device ID configuration register by setting the soft device ID. The timing diagram of FIGS. 17A-B illustrates an example of such a write operation and setting the soft device ID of a first device (e.g., a first integrated circuit chip) having an exemplary hard device ID of "0x61F" (hexadecimal) to an exemplary soft device ID value of "1" (decimal), and setting the soft device ID of a second device (e.g., a second integrated circuit chip) having an exemplary hard device ID of "0x1C7" (hexadecimal) to an exemplary soft device ID value of "2" (decimal). Note that the conventional notation in which "0x" precedes the hexadecimal digits to signify a hexadecimal value is used herein. Also, throughout the timing diagrams herein, the hatching signifies an undefined or irrelevant state (commonly referred to as a "don't care" state in the lexicon of logic design).

In the write operation illustrated in FIGS. 17A-B, in accordance with an active-high select type of SPI protocol the rising edge 158 of the select signal on SPI_SEL signal line 52 indicates the beginning or initiation of the write operation. (For brevity, the select signal on SPI_SEL signal line 52 (FIG. 9) may be referred to hereafter simply as "the select signal," "SPI_SEL" or "the SPI_SEL signal." Likewise, the clock signal received on SPI_CLK signal line 56 (FIG. 9) may be referred to hereafter simply as "the clock signal," "SPI_CLK"

or "the SPI_CLK signal.") The first bit received on SPI_DATA signal line 48 immediately following rising edge 158 is the Write/Read bit, which is a "0" in this example, thereby indicating that the operation is a write operation. Immediately following the Write/Read bit, one address bit ("Aa-1" through "A0") is received on SPI_DATA signal line 48 on each of the next "a" clock cycles. (For brevity, a bit that is sent or received on SPI_DATA signal line 48 (FIG. 9) may be referred to hereafter simply as a data bit or as a bit that is sent or received.) In this example, these 15 address bits (i.e., a=15) represent the address "0x0001" (note that all address bits are "0" except for the least-significant address bit ("A0"), which is a "1"). The address "0x0001" indicates that the write operation is to be performed upon REG1, which in the exemplary embodiment is reserved as the device ID configuration register as described above. Immediately following the address bits, one data bit is received on each of the next 16 clock cycles. In this example, these data bits represent the data value "0x61F1". The first 12 bits of this data value ("DI11" through "DI4" in FIG. 17A) represent the hard device ID of the first device, "0x61F'. The last four bits of this data value ("SI3" through "SI0" in FIG. 17A) represent the soft device ID value of "1" (decimal) to which the first device soft ID is being set. The falling edge 160 of the select signal occurs after the last data bit is received. SPI slave controller 38 compares the received data bits ("DI") to the hard device ID of the first device and, determining that they match, sets REG1[3:0] of register bank 46 to a value of SI, which in this example is "1" (decimal).

With reference to FIG. 17B, which is a continuation of the timing diagram of FIG. 17A, note that following falling edge 160 the value stored in REG1 of the first device changes from "0x1F0" to 0x1F1". The rising edge 162 of SPI_SEL indicates the beginning or initiation of a write operation directed to the second device. The first bit that the second device receives immediately following rising edge 162 is the Write/Read bit, which is a "0" in this example, thereby indicating that the operation is a write operation. Immediately following the Write/Read bit, one address bit ("Aa-1" through "A0") is received on each of the next "a" clock cycles. In this example, these 15 address bits (i.e., a=15) represent the address "0x0001", indicating that the write operation is to be performed upon REG1 (i.e., the device ID configuration register). Immediately following the address bits, one data bit is received on each of the next 16 clock cycles. In this example, these data bits represent the data value "0x1C72". The first 12 bits of this data value ("DI11"-"DI0" in FIG. 17B) represent the hard device ID of the first device, "0x1C7". The last four bits of this data value ("SI3"-"SI0" in FIG. 17B) represent the soft device ID value of "2" (decimal) to which the second device soft ID is being set. The falling edge 164 of the select signal occurs after the last data bit is received. Note that following falling edge 164 the value stored in REG1 of the second device changes from "0x1C70" to 0x1C72".

Figure 18A:
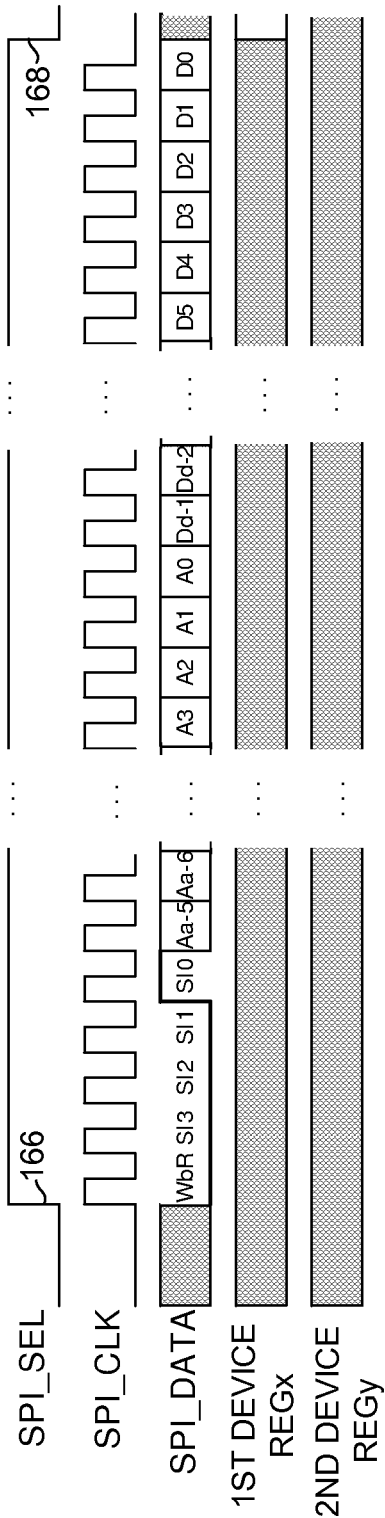
FIG. 18A is a timing diagram illustrating a data write operation in which the device is addressed using a configured soft device ID, in the SPI system of FIG. 9.
Figure 18B:
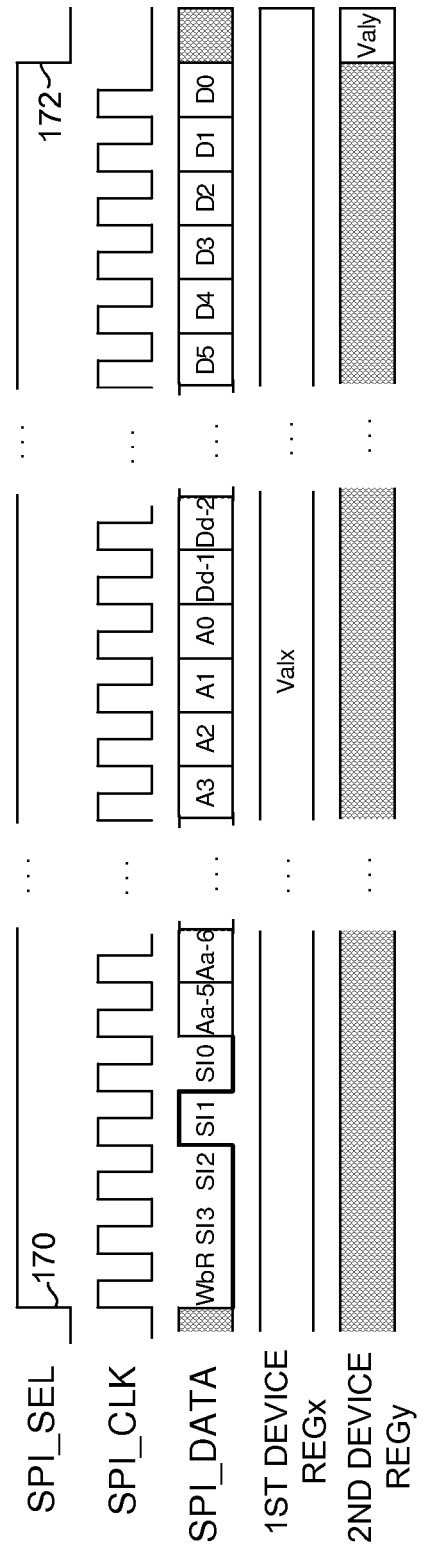
FIG. 18B is a continuation of FIG. 18A.

Once the respective soft device IDs of the first and second devices have been configured or set in the manner described above with regard to FIGS. 17A-B, SPI master controller 44 can thereafter address the first and second devices using their shorter (e.g., O-bit) soft device IDs instead of their longer (e.g., 12-bit) hard device IDs. For example, for first and second devices configured as described above, SPI master controller 44 can direct read and write operations to the first device by using an address beginning with (i.e., having a most-significant digit of) "0x1" and direct read and write operations to the second device by using an address beginning with "0x2". As illustrated in FIGS. 18A-B, the rising edge 166 of SPI_SEL indicates the beginning or initiation of an exemplary write operation. The first bit received immediately following rising edge 166 is the Write/Read bit, which is a "0" in this example, thereby indicating that the operation is a write operation. Immediately following the Write/Read bit, the first four (i.e., the most-significant) of the "a" address bits are received. In this example, the four most-significant address bits ("SI3"-"SI0") represent a most-significant address digit of "1" because the soft device ID of the first device is "1". The remaining address bits ("Aa-5" through "A0") follow the most-significant four address bits. These remaining address bits identify or address one of registers REG2 through REGj in register bank 46 to which the write operation is directed. The register identified by an address "x" in register bank 46 can be referred to as REGx Immediately following the address bits, the "d" data bits ("Dd-1" through "D0") are received. Following receipt of the last data bit D0, SPI slave controller 38 latches the received data value ("Valx") into the register REGx of the first device in response to the falling edge 168 of SPI_SEL.

With reference to FIG. 18B, which is a continuation of the timing diagram of FIG. 18A, the rising edge 170 of SPI_SEL indicates the beginning or initiation of another exemplary write operation. The first bit received immediately following rising edge 170 is the Write/Read bit, which is a "0" in this example, thereby indicating that the operation is a write operation. Immediately following the Write/Read bit, the first four (i.e., the most-significant) of the "a" address bits are received. In this example, the four most-significant address bits ("SI3"-"SI0") represent a most-significant address digit of "2" because the soft device ID of the second device is "2". The remaining address bits ("Aa-5" through "A0") follow the most-significant four address bits. These remaining address bits identify or address one of registers REG2 through REGj in the second device to which the write operation is directed. The register in the second device that is identified by an address "y" can be referred to as REGy Immediately following the address bits, the "d" data bits ("Dd-1" through "D0") are received. Following receipt of the last data bit D0, the received data value ("Valy") is latched into the register REGy of the second device in response to the falling edge 172 of SPI_SEL.

Returning to FIG. 10, an idle state, indicated by block 78, follows block 76 to indicate that SPI slave controller 38 need not perform further actions immediately after setting the soft device ID. From the idle state (block 78), SPI slave controller 38 can either be reset, as described above, or can write to or read from a register, as indicated by block 80. In responding to a write operation or read operation, SPI slave controller 38 can detect which of two or more SPI protocols governs the operation by detecting combinations of the SPI_DATA, SPI_CLK and SPI_SEL signals. Thus, SPI slave controller 38 can respond to a data read or write operation regardless of which SPI protocol is used by SPI master controller 44. In the exemplary embodiment described herein, SPI slave controller 38 can respond to a data read or write operation regardless of whether the operation is in accordance with the active-high select SPI protocol, the active-low select SPI protocol, or the I²C SPI protocol. Nevertheless, in other embodiments, a SPI slave controller in accordance with the present invention can respond to such a data write or read operation that may be in accordance with another type of SPI protocol. Also, in the exemplary embodiment SPI slave controller 38 only detects the protocol when a write operation or read operation immediately follows the reset state (block 70) and not every time a write operation or read operation follows the idle state (block 78). Nevertheless, in other embodiments a SPI slave controller can detect the protocol at any other time.

It is contemplated that performing a read operation or write operation upon one of registers REG2-REGj be performed after performing a write operation upon one or both of the device configuration register REG1 (e.g., as indicated by block 82) and the device ID configuration register REG0 (e.g., as indicated by blocks 74-76). That is, it is contemplated that normal read and write operations intended to affect logic blocks 40, 42, etc. (FIG. 9) be performed after configuring SPI slave controller 38. Nevertheless, block 80 generally represents any write or read operation, including write operations performed upon one of the configuration registers REG0 and REG1.

SPI slave controller 38 can detect whether a data write or data read operation is initiated in accordance with the active-high select SPI protocol, the active-low select SPI protocol, or the I²C SPI protocol by monitoring the SPI_SEL, SPI_DATA and SPI_CLK signals. As described in further detail below, SPI control logic 60 of SPI slave controller 38 can detect the transitions, i.e., rising and falling edges, of SPI_SEL, SPI_DATA and SPI_CLK. By detecting combinations of signal levels and transitions, SPI control logic 60 can detect the initiation of a data write or data read operation, regardless of whether the SPI protocol is active-high select, active-low select, or I²C. SPI slave controller 38 begins operation in the reset state 70 (FIG. 10).

Figure 11A:
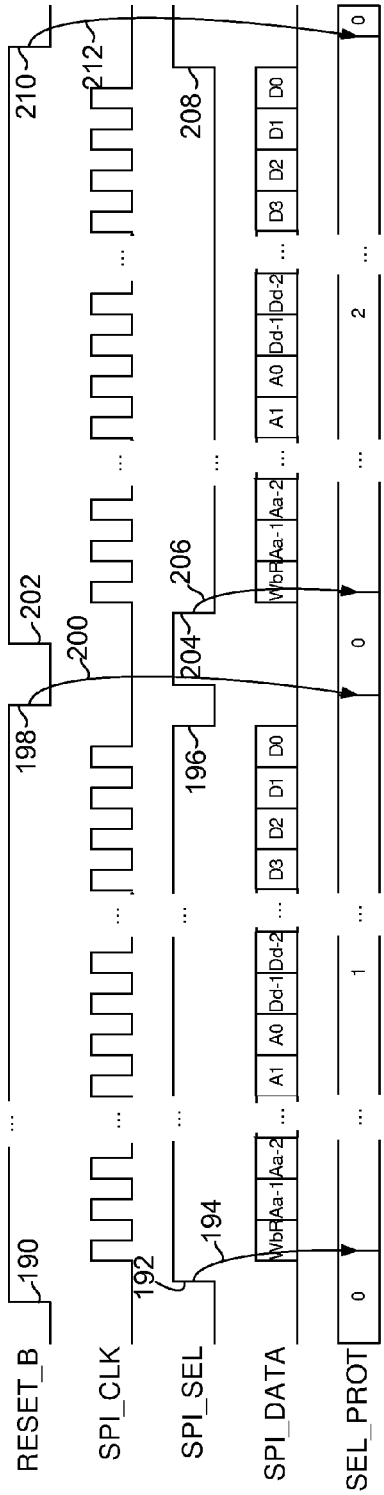
FIG. 11A is a timing diagram illustrating data write operations in accordance with various SPI protocols in the SPI system of FIG. 9.
Figure 11B:
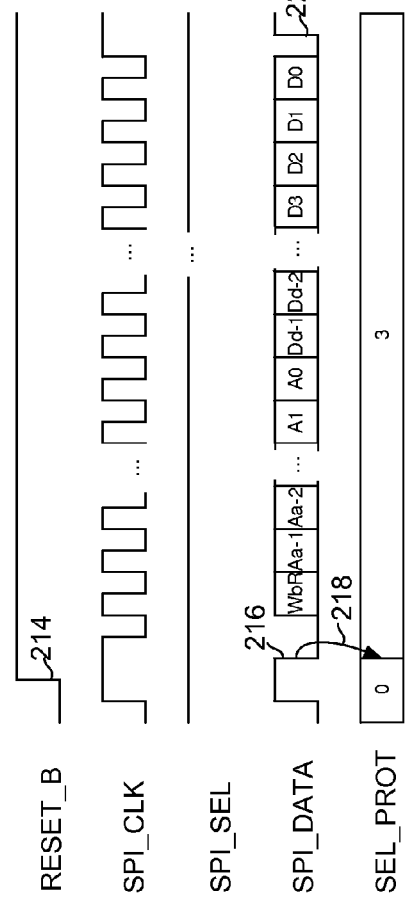
FIG. 11B is a continuation of FIG. 11A.

As illustrated in FIGS. 11A-B, the transition of the active-low hard reset signal RESET_B from an active (or low) state to an inactive (or high) state at the rising edge 190 indicates a data write or data read operation may follow. In response to the deactivation of RESET_B, reset generator 64 (FIG. 9) deactivates an active-high RstSPI signal (not shown in FIGS. 11A-B) that is received by SPI control logic 60. Following this transition of RESET_B, SPI_SEL transitions from a low state to a high state at rising edge 192. As indicated by the curved arrow 194, the combination of rising edge 192 of SPI_SEL and the inactive state of RstSPI indicates to SPI slave controller 38 that SPI master controller 44 is initiating a data write or read operation in accordance with the active-high select SPI protocol. Note that a protocol select signal SEL_PROT transitions from an initial value of "0," which indicates that SPI slave controller 38 has not determined a SPI protocol, to a value of "1," which indicates that SPI slave controller 38 has been determined that a data write or read operation has been initiated in accordance with the active-high select SPI protocol. In accordance with the active-high select SPI protocol, following rising edge 192 of SPI_SEL, SPI master controller 44 starts the clock signal SPI_CLK and sends bits in serial format in synchronism with SPI_CLK. In accordance with the active-high select SPI protocol, the first bit sent is a Write/Read bit ("WbR"). In the example illustrated in FIGS. 11A-B, the Write/Read bit is a "0," thereby indicating to SPI slave controller 38 that the operation is a write operation. Immediately following the Write/Read bit, in accordance with the active-high select SPI protocol, SPI master controller 44 sends one address bit ("Aa-1" through "A0") on each of the next "a" clock cycles. Immediately following the "a" address bits, SPI master controller 44 sends one data bit ("Dd" through "D0") on each of the next "d" clock cycles. Following the last data bit ("D0"), SPI master controller 44 stops SPI_CLK and transitions SPI_SEL to a low state at falling edge 196. SPI master controller 44 then activates RESET_B by transitioning RESET_B from a high state to a low state at falling edge 198. In response to the activation of RESET_B, reset generator 64 correspondingly activates RstSPI. As indicated by the curved arrow 200, the falling edge 198 of RESET_B (via the RstSPI signal received by SPI control logic 60) indicates to SPI slave controller 38 that SPI master controller 44 has completed sending the data relating to the data write operation. Note that SPI slave controller 38 responds to the completion of the data transmission by transitioning SEL_PROT from a value of "1" to a value of "0."

The transition of RESET_B from an active state to an inactive state at the rising edge 202 indicates to SPI slave controller that another data write or data read operation may follow the above-described data write operation. In response to the transition of RESET_B to an active state, reset generator 64 transitions RstSPI (not shown in FIGS. 11A-B) to an active state. Following the activation of these reset signals, SPI master controller 44 transitions SPI_SEL from a low state to a high state. Because SPI_SEL transitions from a low state to a high state while RstSPI is in an active state, SPI slave controller 38 does not interpret this transition of SPI_SEL as indicating the initiation of another data write or read operation. However, SPI master controller 44 then transitions SPI_SEL to a low state again at falling edge 204. As indicated by the curved arrow 206, the combination of falling edge 204 of SPI_SEL and the inactive state of RstSPI indicates to SPI slave controller 38 that SPI master controller 44 is initiating a data write or read operation in accordance with the active-low select SPI protocol. Note that a protocol select signal SEL_PROT transitions from a value of "0" to a value of "2," which indicates that SPI slave controller 38 has been determined that a data write or read operation has been initiated in accordance with the active-low select SPI protocol. In accordance with the active-low select SPI protocol, following falling edge 204 of SPI_SEL, SPI master controller 44 starts the clock signal SPI_CLK and sends bits in serial format on the SPI_DATA signal line in synchronism with SPI_CLK. In accordance with the active-low select SPI protocol, the first bit sent on the SPI_DATA signal line is a Write/Read bit ("WbR"). In the example illustrated in FIGS. 11A-B, the Write/Read bit is a "0," thereby indicating to SPI slave controller 38 that the operation is a write operation. Immediately following the Write/Read bit, in accordance with the active-low select SPI protocol, SPI master controller 44 sends one address bit ("Aa-1" through "A0") on each of the next "a" clock cycles. Immediately following the "a" address bits, SPI master controller 44 sends one data bit ("Dd" through "D0") on each of the next "d" clock cycles. Following the last data bit ("D0"), SPI master controller 44 stops SPI_CLK and transitions SPI_SEL to a high state at rising edge 208. SPI master controller 44 then activates RESET_B by transitioning RESET_B from a high state to a low state at falling edge 210. In response to the activation of RESET_B, reset generator 64 correspondingly activates RstSPI. As indicated by the curved arrow 212, the falling edge 210 of RESET_B (via RstSPI) indicates to SPI slave controller 38 that SPI master controller 44 has completed transmitting the data relating to the data write operation. Note that SPI slave controller 38 responds to the completion of the data transmission by transitioning SEL_PROT from a value of "2" to a value of "0."

The transition of RESET_B from an active state to an inactive state at the rising edge 214 indicates to SPI slave controller 38 that yet another data write or data read operation may follow the above-described data write operations. In response to the transition of RESET_B to an active state, reset generator 64 transitions RstSPI (not shown in FIGS. 11A-B) to an active state. Also, during and after this transition of RESET_B, SPI master controller 38 maintains SPI_CLK in a high state. Following the activation of these reset signals, and while maintaining SPI_CLK in a high state, SPI master controller 44 transitions SPI_DATA from a high state to a low state at falling edge 216. As indicated by the curved arrow 218, the combination of falling edge 216 of SPI_DATA and the high state of SPICLK indicates to SPI slave controller 38 that SPI master controller 44 is initiating a data write or read operation in accordance with the I²C SPI protocol. Note that write or read operations in accordance with the I²C SPI protocol do not use the SPI_SEL signal line. The protocol select signal SEL_PROT then transitions from a value of "0" to a value of "3," indicating that SPI slave controller 38 has been determined that a data write or read operation has been initiated in accordance with the I²C SPI protocol. In accordance with the I²C SPI protocol, following falling edge 216 of SPI_DATA, SPI master controller 44 starts SPICLK and sends bits in serial format on the SPIDATA signal line in synchronism with SPI_CLK. In accordance with the I²C SPI protocol, the first bit sent a Write/Read bit ("WbR"). In the example illustrated in FIGS. 11A-B, the Write/Read bit is a "0," thereby indicating to SPI slave controller 38 that the operation is a write operation. Immediately following the Write/Read bit, in accordance with the active-low select SPI protocol, SPI master controller 44 sends one address bit ("Aa-1" through "A0") on each of the next "a" clock cycles. Immediately following the "a" address bits, SPI master controller 44 sends one data bit ("Dd" through "D0") on each of the next "d" clock cycles. Following the last data bit ("D0"), SPI master controller 44 stops SPI_CLK and transitions SPI_DATA to a high state at rising edge 220. SPI master controller 44 can then initiate another write or read operation in the same manner, i.e., by transitioning SPI_DATA to a low state while SPI_CLK remains in a high state. Alternatively, SPI master controller 44 can activate RESET_B to return SPI slave controller 38 to reset state 70 (FIG. 10).

In a data write or read operation, SPI slave controller 38 of the exemplary embodiment can also detect the polarity of the Write/Read bit. That is, SPI slave controller 38 senses one of two modes: a first mode in which a low Write/Read bit indicates a write operation and a high Write-Read bit indicates a read operation, and a second mode in which a high Write/Read bit indicates a read operation and a low Write/Read bit indicates a write operation. Although it is conventional for a low Write/Read bit to indicate a write operation and a high Write/Read bit to indicate a read operation (i.e., the first mode), the polarity detection feature of the exemplary embodiment accommodates a contemplated instance in which a SPI master controller may initiate a write or read operation in which the Write/Read bit polarity is the opposite (i.e., the second mode). Also, although in the exemplary embodiment SPI slave controller 38 only detects the Write/Read bit polarity when a write operation or read operation immediately follows the reset state (block 70) and not every time a write operation or read operation follows the idle state (block 78), in other embodiments a SPI slave controller can detect the Write/Read bit polarity at any other time.

In the exemplary embodiment, in responding to a write operation, SPI slave controller 38 can not only detect which of several SPI protocols is being used, but SPI slave controller 38 can also detect whether the write operation involves a compressed data mode. The term "compressed" as used herein refers to a mode in which two or more data words are sent during a single write operation. In a compressed mode write operation, SPI slave controller 38 automatically increments the register address each time a data word is received. In the compressed mode write operation illustrated in FIGS. 19A-B, following the rising edge 174 of SPI_SEL, the first bit sent, the Write/Read bit, is a "0," thereby indicating that the operation is a write operation. Immediately following the Write/Read bit, one address bit ("Aa-1" through "A0") is received on each of the next "a" clock cycles. Immediately following the "a" address bits, one data bit ("Dd-1" through "D0") is received on each of the next "d" clock cycles. Following receipt of the last data bit D0, SPI slave controller 38 latches the received data value ("VALx") into the register ("REGx") associated with the received address, as indicated by the curved arrow 176. SPI slave controller 38 can determine which data bit is the last data bit ("D0") of a data word by maintaining a count of the clock cycles ("CntShft"), as described in further detail below. So long as the select signal on SPI_SEL signal line 52 remains high, SPI slave controller 38 continues counting the clock cycles in expectation of receiving another data word. Thus, immediately following receipt of the last data bit ("D0") of the first data word, the first data bit ("Dd") of the second data word is received, etc. Following receipt of the last data bit ("D0") of the second data word, SPI slave controller 38 latches the received data value ("VAL$_{x+1}$") into the register ("REG$_{x+1}$") associated with an address value that is one greater than the received address, as indicated by the curved arrow 178. Likewise, continuing in FIG. 19B, immediately following receipt of the last data bit ("D0") of the second data word, the first data bit ("Dd") of the third data word is received, etc. Following receipt of the last data bit ("D0") of the third data word, SPI slave controller 38 latches the received data value ("VAL$_{x+2}$") into the register ("REG$_{x+2}$") associated with an address value that is two greater than the received address, as indicated by the curved arrow 180. Similarly, immediately following receipt of the last data bit ("D0") of the third data word, the first data bit ("Dd") of the fourth data word is received, etc. Following receipt of the last data bit ("D0") of the fourth data word, SPI slave controller 38 latches the received data value ("VAL$_{x+3}$") into the register ("REG$_{x+3}$") associated with an address value that is three greater than the received address, as indicated by the curved arrow 182. In this example of a compressed mode write operation, SPI master controller 44 sends four data words and causes the select signal on SPI_SEL line 52 to fall or go low following the last data bit ("D0") of the fourth data word. SPI slave controller 38 responds to the falling edge 184 of the select signal by terminating the above-referenced shift count ("CntShft").

Returning to FIG. 10, as indicated by block 82, SPI slave controller 38 can respond to a write operation to the above-referenced interface configuration register that is initiated by SPI master controller 44. As noted above, the interface configuration register can be, for example, the register having an index of "0" (REG0) in register bank 46. In response to a write operation performed upon REG0, a number of operational modes are set or configured in SPI slave controller 38. Once these operational modes are configured in this manner, any further data write or read operation (block 80) that may be performed upon a register (other than REG0 or REG1) is performed in accordance with the configured operational modes that have been set. These operational modes include: whether, in a write operation, data is latched into the register in response to SPI_CLK or SPI_SEL; whether, in a write operation, incoming data is sampled on a rising clock edge or falling clock edge; whether, in a write operation, incoming address precedes incoming data or incoming data precedes incoming address; whether in a write operation, incoming data bits are ordered from most-significant to least-significant or from least-significant to most-significant; the number of clock cycles of delay in a read operation for data to be output; the number of bits that represent the address in a read or write operation; and the number of bits that represent the data word in a read or write operation. These operational modes are described below in further detail with reference to the timing diagrams of FIGS. 12-16.

As indicated by block 84, SPI slave controller 38 can set the latch mode that is to be used or applied in any further data write operation (i.e., following the write operation upon the interface configuration register) that may be performed upon another register. The timing diagrams of FIGS. 12A and 12B illustrate how the latch mode is applied during a further data write operation, in accordance with an active-high select type of SPI protocol.

Figure 12A:
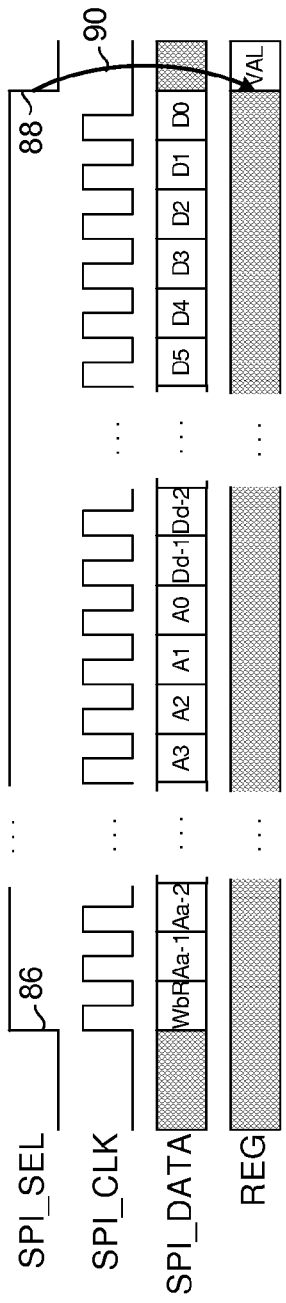
FIG. 12A is a timing diagram illustrating a data write operation in accordance with an active-high select SPI protocol and a first sampling latch mode, in the SPI system of FIG. 9.

The write operation illustrated in FIG. 12A represents applying a latching mode in which data is to be latched into a register in response to SPI_SEL. This latching mode can be indicated or set (block 84) by, for example, a "1" stored in the bit position of the interface configuration register associated with latching mode, REG0[1] (FIG. 27). In the write operation illustrated in FIG. 12A, following the rising edge 86 of SPI_SEL, the first bit that is received, the Write/Read bit, is a "0," thereby indicating that the operation is a write operation. Immediately following the Write/Read bit, one address bit ("Aa-1" through "A0") is received on each of the next "a" clock cycles. Immediately following the address bits, one data bit ("Dd-1" through "D0") is received on each of the next "d" clock cycles. Following receipt of the last data bit D0, SPI slave controller 38 latches the received data value ("VAL") into a register ("REG") associated with the received address in response to the falling edge 88 of SPI_SEL, as indicated by the curved arrow 90.

Figure 12B:
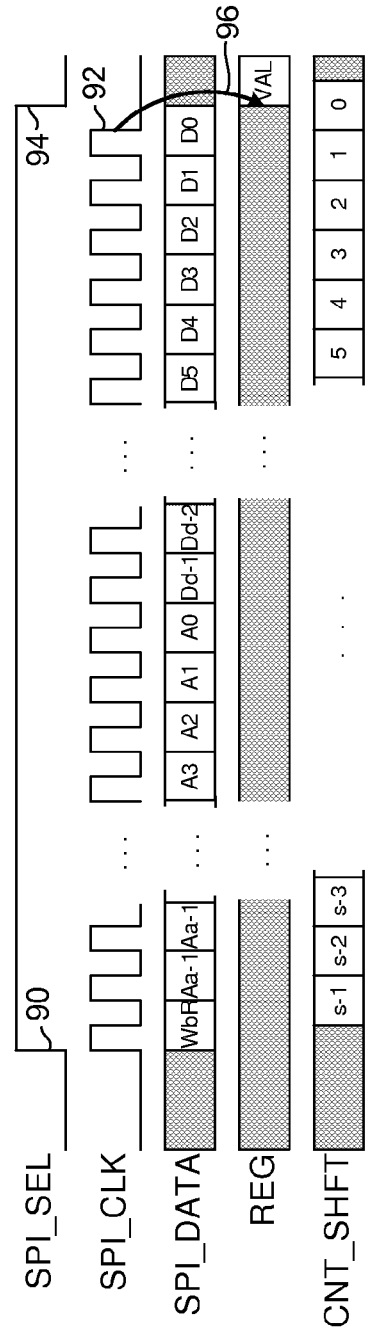
FIG. 12B is a timing diagram illustrating a data write operation in accordance with an active-high select SPI protocol and a second sampling latch mode, in the SPI system of FIG. 9.

The write operation illustrated in FIG. 12B represents applying a latching mode in which data is to be latched into a register in response to SPI_CLK. This latching mode can be indicated or set (block 84) by, for example, a "0" stored in the bit position of the interface configuration register (REG0[1]) associated with latching mode (see FIG. 27). In the write operation illustrated in FIG. 12B, following the rising edge 90 of the select signal on SPI_SEL signal line 52 (FIG. 9), the first bit that is received, the Write/Read bit, is a "0," thereby indicating that the operation is a write operation. Immediately following the Write/Read bit, one address bit ("Aa-1" through "A0") is received on each of the next "a" clock cycles. Immediately following the address bits, one data bit ("Dd-1" through "D0") is received on each of the next "d" clock cycles. Following receipt of the last data bit D0, SPI slave controller 38 latches the received data value ("VAL") into a register ("REG") associated with the received address in response to not the falling edge 92 of the select signal but rather to the falling edge 94 of SPI_CLK, as indicated by the curved arrow 96. To determine the clock cycle on which to latch the data value, SPI slave controller 38 counts ("CNT_SHFT") the number of clock cycles during which address bits and data bits are received and, based on the total number of address bits and data bits that are counted, latches the data value on the clock cycle associated with the last data bit received ("D0").

Returning to FIG. 10, as indicated by block 98, SPI slave controller 38 can set the clock edge mode that is to be used or applied in any further data write operation. The timing diagrams of FIGS. 13A and 13B illustrate how the clock edge mode is applied during a further data write operation, in accordance with an active-high select type of SPI protocol.

Figure 13A:
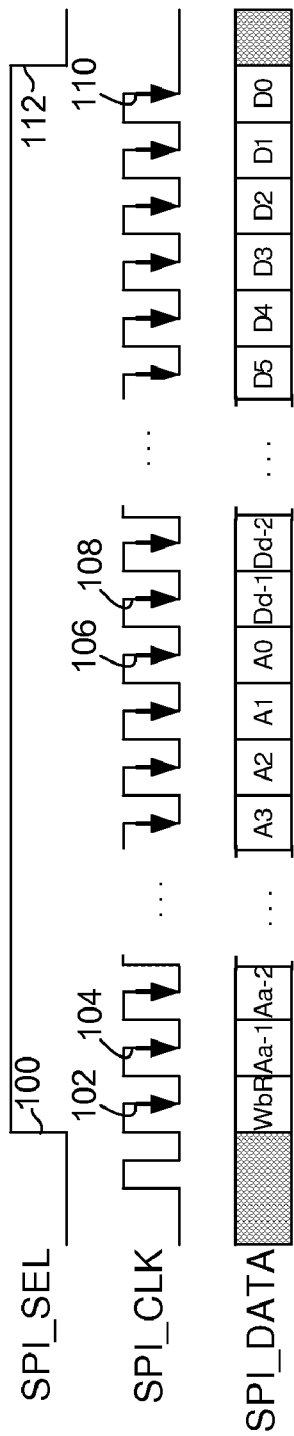
FIG. 13A is a timing diagram illustrating a data write operation in accordance with an active-high select SPI protocol and a first clock edge mode, in the SPI system of FIG. 9.

The write operation illustrated in FIG. 13A represents applying a clock edge mode in which each data bit that is received is sampled in response to a falling or negative edge or transition of the clock signal (SPI_CLK). This negative clock edge mode can be indicated or set (block 98) by, for example, a "1" stored in the bit position of the interface configuration register (FIG. 27) associated with clock edge mode, REG0[0] (see FIG. 27). In the write operation illustrated in FIG. 13A, following the rising edge 100 of the select signal on SPI_SEL signal line 52 (FIG. 9), the first bit that is received, the Write/Read bit, is a "0," thereby indicating that the operation is a write operation. Note that the Write/Read bit is sampled on the negative edge 102 of SPI_CLK. Immediately following the Write/Read bit, one address bit ("Aa-1" through "A0") is received on each of the next "a" clock cycles. Note that the first address bit (Aa-1) is sampled on the negative edge 104 of SPI_CLK, and the last address bit (A0) is sampled on the negative edge 106 of SPI_CLK. Immediately following the address bits, one data bit ("Dd-1" through "D0") is received on each of the next "d" clock cycles. Note that the first data bit (Dd-1) is sampled on the negative edge 108 of SPI_CLK, and the last data bit (D0) is sampled on the negative edge 110 of SPI_CLK. Following receipt of the last data bit D0, SPI slave controller 38 latches the received data value ("VAL") into a register ("REG") associated with the received address in response to the falling edge 112 of SPI_SEL.

Figure 13B:
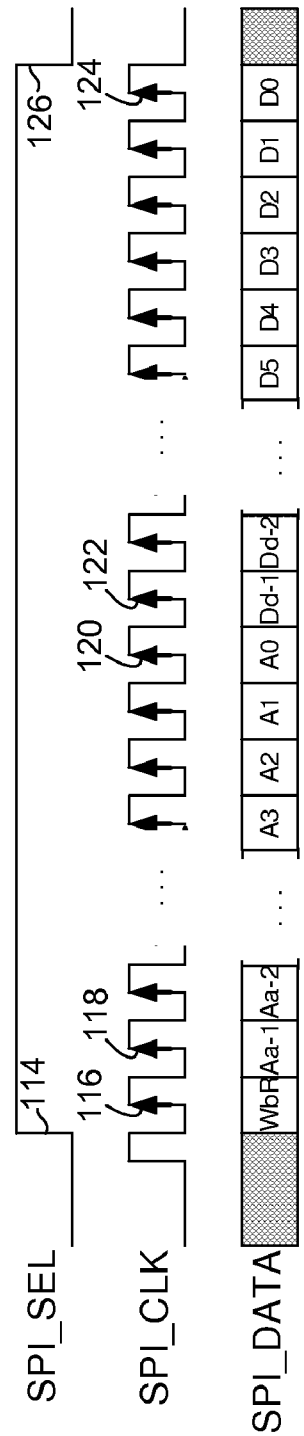
FIG. 13B is a timing diagram illustrating a data write operation in accordance with an active-high select SPI protocol and a second clock edge mode, in the SPI system of FIG. 9.

The write operation illustrated in FIG. 13B represents applying a clock edge mode in which each data bit that is received is sampled in response to a rising or positive edge or transition of SPI_CLK. This negative clock edge mode can be indicated or set (block 98) by, for example, a "0" stored in the bit position of the interface configuration register REG0[0] associated with clock edge mode (see FIG. 27). In the write operation illustrated in FIG. 13B, following the rising edge 114 of the select signal on SPI_SEL, the first bit that is received, the Write/Read bit, is a "0," thereby indicating that the operation is a write operation. Note that the Write/Read bit is sampled on the positive edge 116 of SPI_CLK. Immediately following the Write/Read bit, one address bit ("Aa-1" through "A0") is received on each of the next "a" clock cycles. Note that the first address bit (Aa-1) is sampled on the positive edge 118 of SPI_CLK, and the last address bit (A0) is sampled on the negative edge 120 of SPI_CLK. Immediately following the address bits, one data bit ("Dd-1" through "D0") is received on each of the next "d" clock cycles. Note that the first data bit (Dd-1) is sampled on the positive edge 122 of SPI_CLK, and the last data bit (D0) is sampled on the positive edge 124 of SPI_CLK. Following receipt of the last data bit D0, SPI slave controller 38 latches the received data value ("VAL") into a register ("REG") associated with the received address in response to the falling edge 126 of SPI_SEL.

Returning to FIG. 10, as indicated by block 128, SPI slave controller 38 can set the word order mode that is to be used or applied in any further data write operation that may be performed. The timing diagrams of FIGS. 14A and 14B illustrate how the word order mode is applied during a further data write operation, in accordance with an active-high select type of SPI protocol.

Figure 14A:
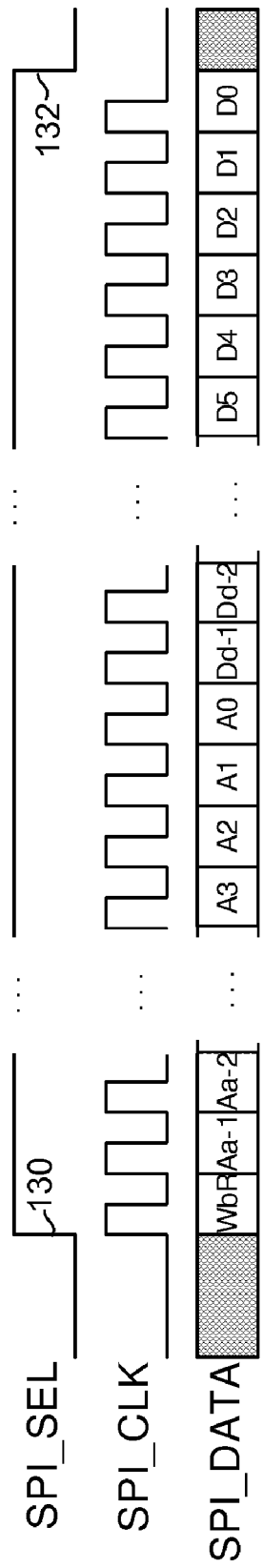
FIG. 14A is a timing diagram illustrating a data write operation in accordance with an active-high select SPI protocol and a first word order mode, in the SPI system of FIG. 9.

The write operation illustrated in FIG. 14A represents setting a word order mode in which address bits precede data bits in the serial bit stream that is received. This word order mode can be indicated or set (block 128) by, for example, a "0" stored in the bit position of the interface configuration register REG0[11] associated with word order mode (see FIG. 27). In the write operation illustrated in FIG. 14A, following the rising edge 130 of SPI_SEL, the first bit that is received, the Write/Read bit, is a "0," thereby indicating that the operation is a write operation. Immediately following the Write/Read bit, one address bit ("Aa-1" through "A0") is received on each of the next "a" clock cycles. Immediately following the address bits, one data bit ("Dd-1" through "D0") is received on SPI-DATA signal line 48 on each of the next "d" clock cycles. The falling edge 132 of SPI_SEL occurs after the last data bit ("D0") is received.

Figure 14B:
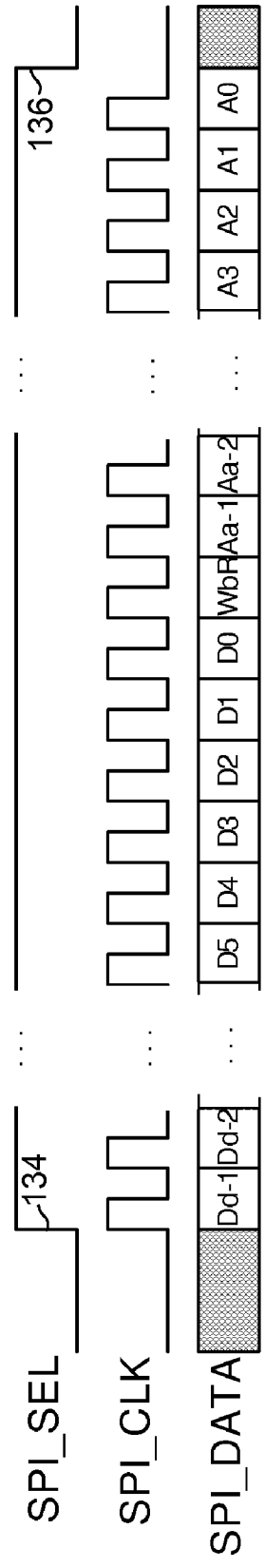
FIG. 14B is a timing diagram illustrating a data write operation in accordance with an active-high select SPI protocol and a second word order mode, in the SPI system of FIG. 9.

The write operation illustrated in FIG. 14B represents setting a word order mode in which data bits precede address bits in the serial bit stream that is received. This word order mode can be indicated or set (block 128) by, for example, a "1" stored in the bit position of the interface configuration register REG0[11] associated with word order mode (see FIG. 27). In the write operation illustrated in FIG. 14B, following the rising edge 134 of SPI_SEL, one data bit ("Dd-1" through "D0") is received on each of the next "d" clock cycles. The Write/Read bit is received immediately following the last data bit ("D0"). In the illustrated example, the Write/Read bit, is a "0," thereby indicating that the operation is a write operation. Immediately following the Write/Read bit, one address bit ("Aa-1" through "A0") is received on each of the next "a" clock cycles. The falling edge 136 of the select signal occurs after the last address bit ("A0") is received.

Returning to FIG. 10, as indicated by block 138, SPI slave controller 38 can set the bit order mode that is to be used or applied in any further data write operation that may be performed. The timing diagrams of FIGS. 15A and 15B illustrate how the bit order mode is applied during a further data write operation, in accordance with an active-high select type of SPI protocol.

Figure 15A:
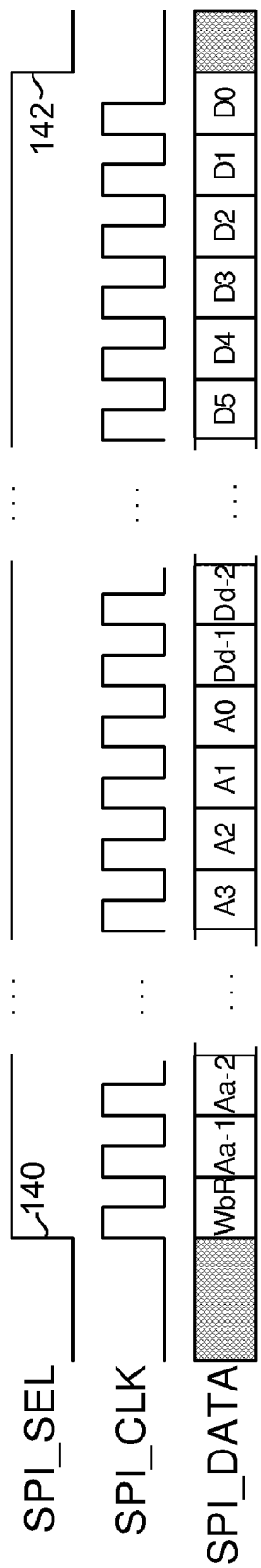
FIG. 15A is a timing diagram illustrating a data write operation in accordance with an active-high select SPI protocol and a first bit order mode, in the SPI system of FIG. 9.

The write operation illustrated in FIG. 15A represents applying a bit order mode in which the address and data bits arrive serially in order from most-significant to least-significant. This bit order mode can be indicated or set (block 138) by, for example, a "0" stored in the bit position of the interface configuration register REG0[12] associated with bit order mode (see FIG. 27). In the write operation illustrated in FIG. 15A, following the rising edge 140 of SPI_SEL, the first bit that is received, the Write/Read bit, is a "0," thereby indicating that the operation is a write operation. Immediately following the Write/Read bit, the first address bit ("Aa-1") is received during the next clock cycle ("SPI_CLK"). This first address bit is the most-significant address bit ("Aa-1"). The next address bit that is received is the next-most-significant address bit ("Aa-2"). Address bits continue to be received in this manner, on successive clock cycles, until the last address bit, which is the least-significant bit ("A0"), is received. Immediately following the address bits, the data bits are received in a similar manner. That is, the first data bit ("Dd-1") is received during the next clock cycle. This first data bit is the most-significant data bit ("Dd-1"). The next data bit that is received is the next-most-significant data bit ("Dd-2"). Data bits continue to be received in this manner, on successive clock cycles, until the last data bit, which is the least-significant bit ("D0"), is received. The falling edge 142 of SPI_SEL occurs after the last data bit ("D0") is received.

Figure 15B:
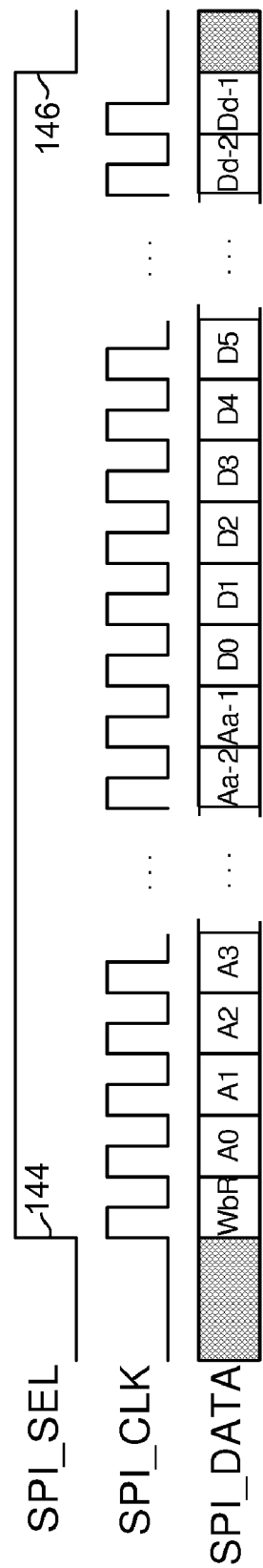
FIG. 15B is a timing diagram illustrating a data write operation in accordance with an active-high select SPI protocol and a second bit order mode, in the SPI system of FIG. 9.

The write operation illustrated in FIG. 15B represents applying a bit order mode in which the address and data bits arrive serially in order from most-significant to least-significant. This bit order mode can be indicated or set (block 138) by, for example, a "1" stored in the bit position of the interface configuration register REG0[12] associated with bit order mode (see FIG. 27). In the write operation illustrated in FIG. 15A, following the rising edge 144 of SPI_SEL, the first bit that is received, the Write/Read bit, is a "0," thereby indicating that the operation is a write operation. Immediately following the Write/Read bit, the first address bit ("A0") is received during the next clock cycle ("SPI_CLK"). This first address bit is the least-significant address bit ("A0"). The next address bit that is received is the next-least-significant address bit ("A1"). Address bits continue to be received in this manner, on successive clock cycles, until the last address bit, which is the most-significant bit ("Aa-1"), is received. Immediately following the address bits, the data bits are received in a similar manner. That is, the first data bit ("D0") is received on SPI_DATA signal line 48 during the next clock cycle. This first data bit is the least-significant data bit ("D0"). The next data bit that is received is the next-least-significant data bit ("D1"). Data bits continue to be received in this manner, on successive clock cycles, until the last data bit, which is the most-significant bit ("Dd-1"), is received. The falling edge 146 of SPI_SEL occurs after the last data bit ("Dd-1") is received.

Returning to FIG. 10, as indicated by block 148, SPI slave controller 38 can set the turnaround length mode that is to be used or applied in any data read operation that may be performed. The timing diagrams of FIGS. 16A and 16B illustrate how the turnaround length mode is applied during a data read operation, in accordance with an active-high select type of SPI protocol.

Figure 16A:
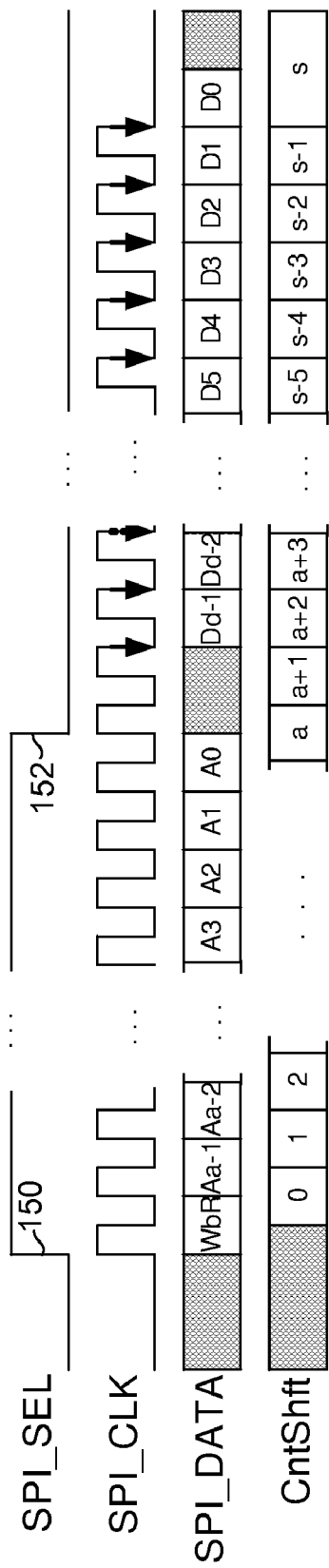
FIG. 16A is a timing diagram illustrating a data write operation in accordance with an active-high select SPI protocol and a first turnaround length mode, in the SPI system of FIG. 9.

The write operation illustrated in FIG. 16A represents applying a turnaround length mode in which the turnaround length is set to an exemplary length of 1½ clock cycles. This turnaround mode can be indicated or set (block 148) by, for example, a three-bit turnaround length word stored in the bit positions of the interface configuration register REG0[10:8] associated with turnaround length mode (see FIG. 27). In the exemplary embodiment, the turnaround length word can be programmed or set with a resolution of one-half of a clock cycle. For example, if a turnaround length word "001" is stored in REG0[10:8], the turnaround length is one-half bit. If a turnaround length word "011" is stored in REG0[10:8], the turnaround length is 1½ bits. If a turnaround length word "110" is stored in REG0[10:8], the turnaround length is three bits. In the write operation illustrated in FIG. 16A, following the rising edge 150 of SPI_SEL, the first bit that is received, the Write/Read bit, is a "1," thereby indicating that the operation is a read operation. Immediately following the Write/Read bit, one address bit ("Aa-1" through "A0") is received on each of the next "a" clock cycles. In a read operation in accordance with an active-high select type of SPI protocol, the falling edge 152 of SPI_SEL occurs after the last address bit ("A0") is received. In response to SPI_SEL and the address bits, SPI slave controller 38 reads the contents (data word) of the register in register bank 46 (FIG. 9) corresponding to the address. In the example illustrated in FIG. 16A, the turnaround length is set to 1½ clock cycles. Thus, 1½ clock cycles after the clock cycle on which the last address bit was received, SPI slave controller 38 makes the first bit of the data word that was read from the register available on the SPI_DATA signal line 48 (FIG. 9), i.e., SPI slave controller 38 sends the first data bit. SPI slave controller 38 causes one data bit ("Dd-1" through "D0") to be sent on each of the next "d" clock cycles.

Figure 16B:
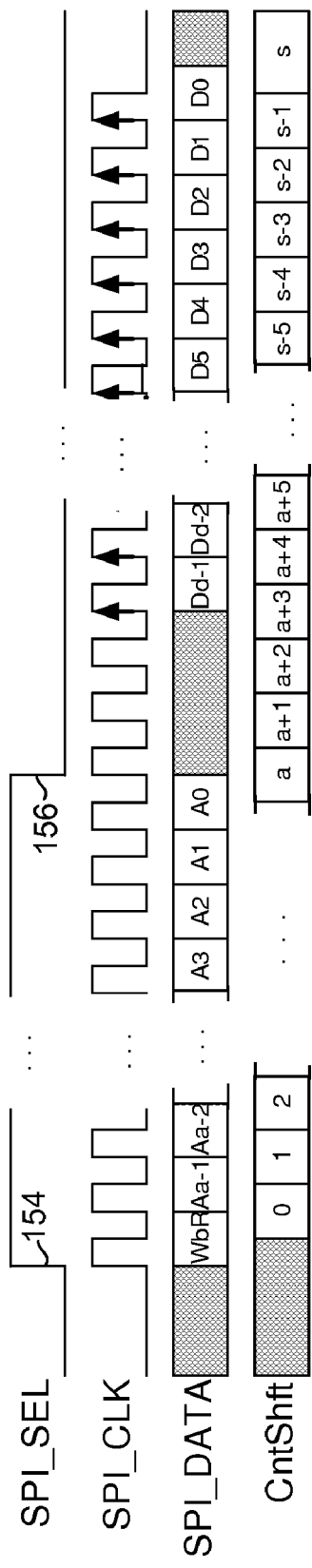
FIG. 16B is a timing diagram illustrating a data write operation in accordance with an active-high select SPI protocol and a second turnaround length mode, in the SPI system of FIG. 9.

The write operation illustrated in FIG. 16B represents applying a turnaround length mode in which the turnaround length is set to an exemplary length of three clock cycles. Following the rising edge 154 of SPI_SEL, the first bit that is received, the Write/Read bit, is a "1," thereby indicating that the operation is a read operation. Immediately following the Write/Read bit, one address bit ("Aa-1" through "A0") is received on each of the next "a" clock cycles. The falling edge 156 of SPI_SEL occurs after the last address bit ("A0") is received. In response to SPI_SEL and the address bits, SPI slave controller 38 reads the contents (data word) of the register in register bank 46 (FIG. 9) corresponding to the address. Three clock cycles (i.e., the turnaround length) after the clock cycle on which the last address bit was received, SPI slave controller 38 makes the first bit of the data word that was read from the register available on the SPI_DATA signal line 48 (FIG. 9), i.e., sends the first data bit. SPI slave controller 38 sends one data bit ("Dd-1" through "D0") on each of the next "d" clock cycles.

Returning to FIG. 10, as indicated by block 186, SPI slave controller 38 can detect the data length mode. The data length mode indicates the number of data bits ("d") that occur in any data write or read operation that may be performed. The data length mode can be indicated or set by, for example, a 2-bit data length word stored in the bit positions of the interface configuration register REG0[3:2] associated with data length control (see FIG. 27). In the exemplary embodiment, the data length word can be programmed or set to any of the following discrete values: 8, 16 or 28. Writing a value of "1" (decimal) to REG0[3:2] sets the number of data bits ("d") to 8. Writing a value of "2" (decimal) to REG0[3:2] sets the number of data bits ("d") to 16. Writing a value of "3" (decimal) to REG0[3:2] sets the number of data bits ("d") to 28. Nevertheless, in other embodiments the data length can be settable to other discrete values. If SPI master controller 44 initiates a write operation in which a value of "1," "2" or "3" is stored in REG0[3:2], then SPI slave controller 38 uses the corresponding data length ("d") in the manner described above. For example, SPI slave controller 38 uses the configured data length value in maintaining a count of received data and address bits. However, if a value of "0" is stored in REG0[3:2], then in response to a further write or read operation SPI slave controller 38 defaults to a dynamic or on-the-fly selection of one of a number of discrete data lengths ("d" or "DetLenData") in response to a count ("CntShft") of the total number of received bits (i.e., address bits, data bits, and Write/Read bit) during a write operation. In the exemplary embodiment, SPI slave controller 38 determines that the data length is 28 bits if a total of more than 32 bits are received in a write operation, determines that the data length is 16 bits if a total of more than 20 but fewer than 32 bits are received in a write operation, and determines that the data length is eight bits if fewer than 20 bits in total are received in a write operation. Nevertheless, in such a default mode in other embodiments, the data length can be determined from any other such set of discrete values in response to any other suitable criteria.

Returning to FIG. 10, as indicated by block 188, SPI slave controller 38 can detect the address length mode. The address length mode indicates the number of address bits ("a") that occur in any data write or read operation that may be performed. The address length mode can be indicated or set by, for example, a 4-bit address length word stored in the bit positions of the interface configuration register REG0[7:4] associated with address length control (see FIG. 27). In the exemplary embodiment, the address length word can be programmed or set to any value between one and 15 by writing the equivalent binary word to REG0[7:4]. Nevertheless, in other embodiments the address length can be settable to a value within any other suitable range. If SPI master controller 44 initiates a write operation in which any value ("a") other than "0" is stored in REG0[7:4], then SPI slave controller 38 uses that configured address length ("a") in the manner described above. For example, SPI slave controller 38 uses the configured address length value in maintaining a count of received address and data bits. However, if a value of "0" is stored in REG0[7:4], then in response to a further write or read operation SPI slave controller 38 computes the address length ("a" or "DetLenAddr") based upon the difference between a count ("CntShft") of the total number of received bit (i.e., address bits, data bits and Write/Read bit) during a write operation and the number of data bits ("d" or "DetLenData") in the write operation: DetLenAddr=CntShft−DetLenData−1. For example, in an instance in which the number of data bits ("d") is 16, and SPI slave controller 38 receives a total ("CntShft") of 32 bits, SPI slave controller 38 determines that the address length ("a" or "DetLenAddr") in the write operation is 15 bits.

Figure 20:
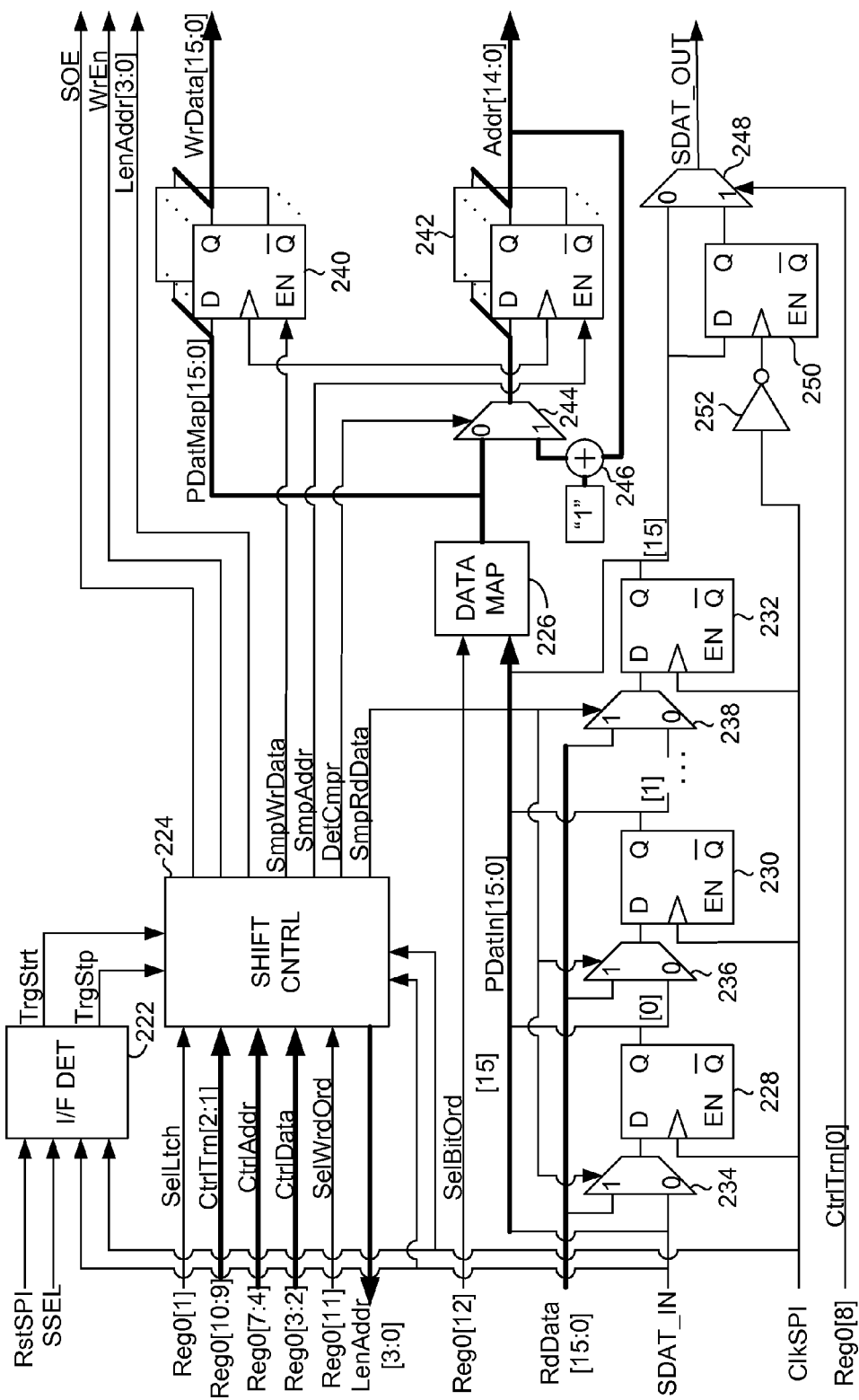
FIG. 20 is a block diagram of the SPI control logic of the SPI system of FIG. 9.

In FIG. 20, SPI control logic 60 (FIG. 9) is shown in further detail. SPI control logic 60 operates in conjunction with the other elements of SPI slave controller 38 described herein to perform read and write operations upon registers of register bank 46. SPI control logic 60 includes an interface detector 222, a shift controller 224, a data mapper 226, and a shift register comprising a number of flip-flops 228, 230, 232, etc. (with additional flip-flops not shown for purposes of clarity being indicated by the ellipsis (" . . . ") symbol). The shift register converts serial-format data bits (SDAT_IN) received via the SPI_DATA signal line 48 (FIG. 9) into parallel-format data words that are output to data mapper 226. The shift register also converts data words (RdData[15:0]) that are read from register bank 46 (FIG. 9) into serial data (SDAT_OUT) to be output via the SPI_DATA signal line 48. Each of flip-flops 228, 230, 232, etc., has an associated multiplexer 234, 236, 238, etc., at its input that selects SDAT_IN if a write operation is occurring or RdData[15:0] if a read operation is occurring. Shift controller 224 generates a shift register sample selection signal SmpRdData that controls multiplexers 234, 236, 238, etc.

Data mapper 226 either passes the data through unchanged or reorders the bits, in accordance with the above-described bit order mode as indicated by a signal SelBitOrd that represents the contents of REG0[12]. A flip-flop array (i.e., a register) 240 latches the output of data mapper 226 as a write data word WrData[15:0]. Shift controller 224 generates a write data sample signal SmpWrData that controls flip-flop array 240.

Shift controller 224 also generates an address sample signal SmpAddr that controls another flip-flop array (i.e., register) 242, which latches the output of data mapper 226 as an address Addr[14:0]. Shift controller 224 generates a compressed mode detection signal DetCmpr for controlling a multiplexer 244 at the input of flip-flop array 242. If DetCmpr indicates compressed mode, an adder 246 increments Addr[14:0] by one and feeds the result back to the selected input of multiplexer 244.

The serial data output (SDAT_OUT) is selected by a multiplexer 248 either from the shift register output or from a flip-flop 250, response to REG0[8]. Flip-flop 250 is used in an instance in which the least-significant bit of the turnaround length word (CtrlTrn[0]) stored in REG0[10:8] is a "1", indicating that the turnaround length is not an integer number of clock cycles but rather includes a half cycle. As described above, the turnaround length word can be programmed or set with a resolution of one-half of a clock cycle. For example, a turnaround length of 1½ clock cycles can be set. Accordingly, in an instance in which REG0[8] is set to "1", an inverter 252 inverts ClkSPI so that flip-flop 250 latches the shift register output on the falling edge of ClkSPI. In an instance in which REG[8] is set to "0", multiplexer 248 does not select the output of flip-flop 250 but rather selects the shift register output directly.

Figure 21:
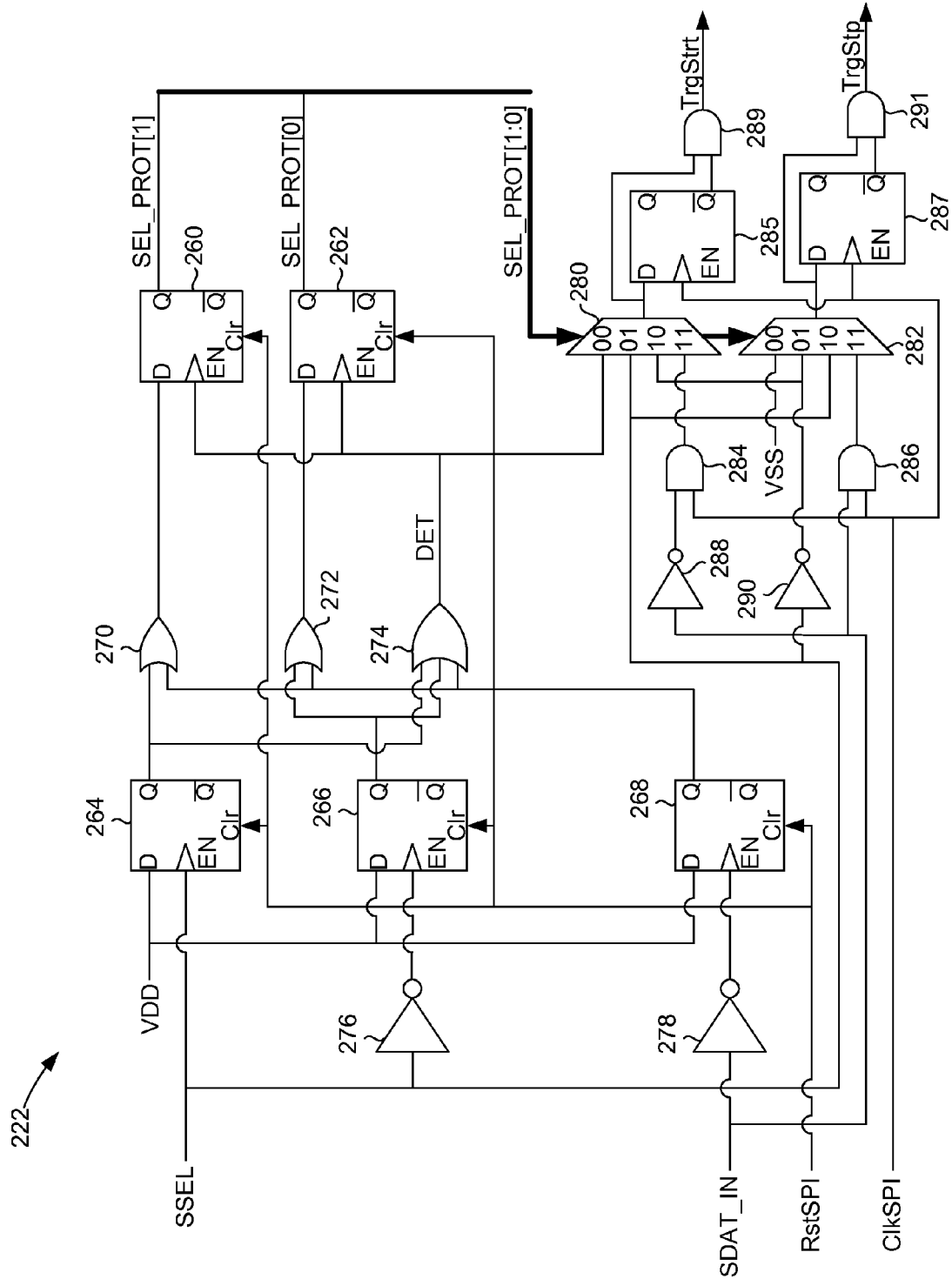
FIG. 21 is a block diagram of the interface detector of the SPI control logic of FIG. 20.

In FIG. 21, interface detector 222 (FIG. 20) is shown in further detail. Interface detector 222 includes two flip-flops 260 and 262 that output the protocol select signal SEL_PROT[1:0] that indicates which one of the SPI protocols governs the data write or read operation. As described above with regard to FIGS. 11A-B, SEL_PROT has a value of "1" when interface detector 222 detects a data write or read operation in accordance with the active-high select SPI protocol, has a value of "2" when interface detector 222 detects a data write or read operation in accordance with the active-low select SPI protocol, and has a value of "3" when interface detector 222 detects a data write or read operation in accordance with the I²C SPI protocol. The detection circuitry includes three flip-flops 264, 266 and 268, three OR gates 270, 272 and 274, and two inverters 276 and 278. Each of flip-flops 260, 262, 264, 266 and 268 is cleared to "0" when the reset signal RstSPI is asserted. After RstSPI released, the group of flip-flops 264, 266 and 268 detect the start event of one of the interface protocols (i.e., active-high select, active-low select or I²C). Flip-flop 264 is set to "1" upon the rising edge of the select signal SPI_SEL for active-high SPI protocol detection. Flip-flop 266 is set to "1" upon the falling edge of SPI_SEL for active-low SPI protocol detection. Flip-flop 268 is set to "1" upon the falling edge of SPI_DATA for I²C SPI protocol detection. After any of the three flip-flops 264, 266 and 268 is set to "1", OR gate 274 changes the detect signal DET from low to high. The detect signal DET remains high until RstSPI is asserted. The two OR gates 270 and 272 binary decode the state of the three flip-flops 264, 266 and 268. The states of the three flip-flops 264, 266 and 268 are samples to flip-flops 260 and 262 with the rising edge of DET.

Trigger signal circuitry, comprising two multiplexers 280 and 282, two flip-flops 285 and 287, and two AND gates 289 and 291, is controlled by SEL_PROT and outputs the start trigger signal TrgStrt and stop trigger TrgStp signals, respectively. Multiplexer 280 selects the start trigger event associated with the detected SPI protocol. If active-high select SPI protocol has been detected, multiplexer 280 selects the rising edge of SPI_SEL as a start trigger. If active-low select SPI protocol has been detected, multiplexer 280 selects the falling edge of SPI_SEL as a start trigger. If I²C SPI protocol has been detected, multiplexer 280 selects the combination (via an AND gate 284 and inverter 288) of a falling edge of SPI_DATA occurring while SPI_CLK is high as a start trigger. If no SPI protocol has been detected yet, multiplexer 280 selects DET is used as an initial start trigger. Multiplexer 282 selects the stop trigger event associated with the detected SPI protocol. If active-high select SPI protocol has been detected yet, multiplexer 282 selects the falling edge of SPI_SEL (via an inverter 290) as a stop trigger. If active-low select SPI protocol has been detected, multiplexer 282 selects the rising edge of SPI_SEL as a stop trigger. If I²C SPI protocol has been detected, multiplexer 282 select the combination (via an AND gate 286) of a rising edge of SPI_DATA occurring while SPI_CLK is high as a stop trigger. If no SPI protocol has been detected yet, multiplexer 282 selects an input that is tied low (e.g., connected to a fixed voltage such as VSS or ground), because no stop trigger is needed yet.

Figure 22:
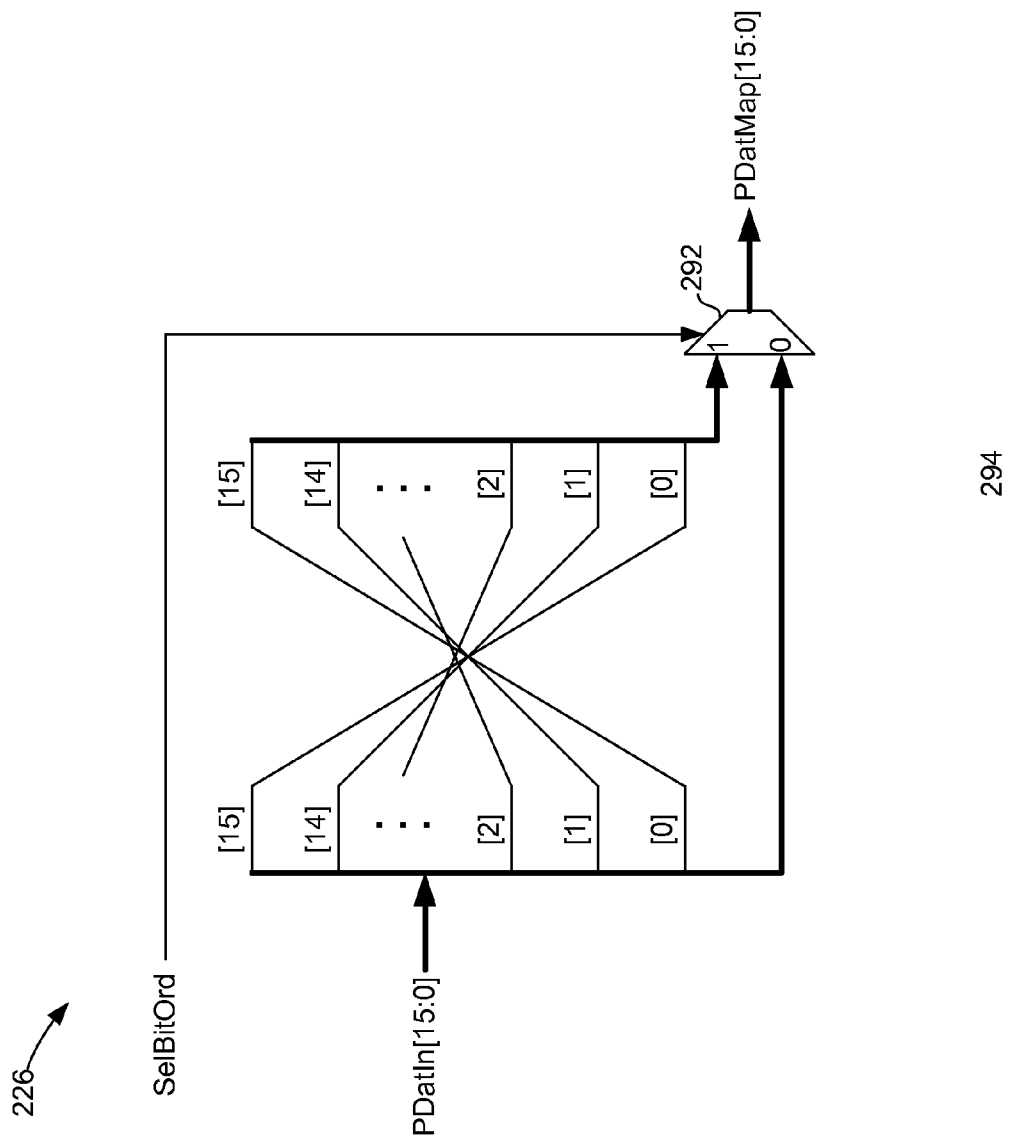
FIG. 22 is a block diagram of the data mapper of the SPI control logic of FIG. 20.

In FIG. 22, data mapper 226 (FIG. 20) is shown in further detail. In response to the SelBitOrd signal (REG0[12]), a multiplexer 292 selects either the parallel data word PDatIn [15:0] or a word in which the bit positions of PDatIn[15:0] are reversed. That is, when SelBitOrd is low, PDatMap[15:0]= PDatIn[15:0]. However, when SelBitOrd is high, PDatMap [15:0]=PDatIn[0:15].

Figure 23:
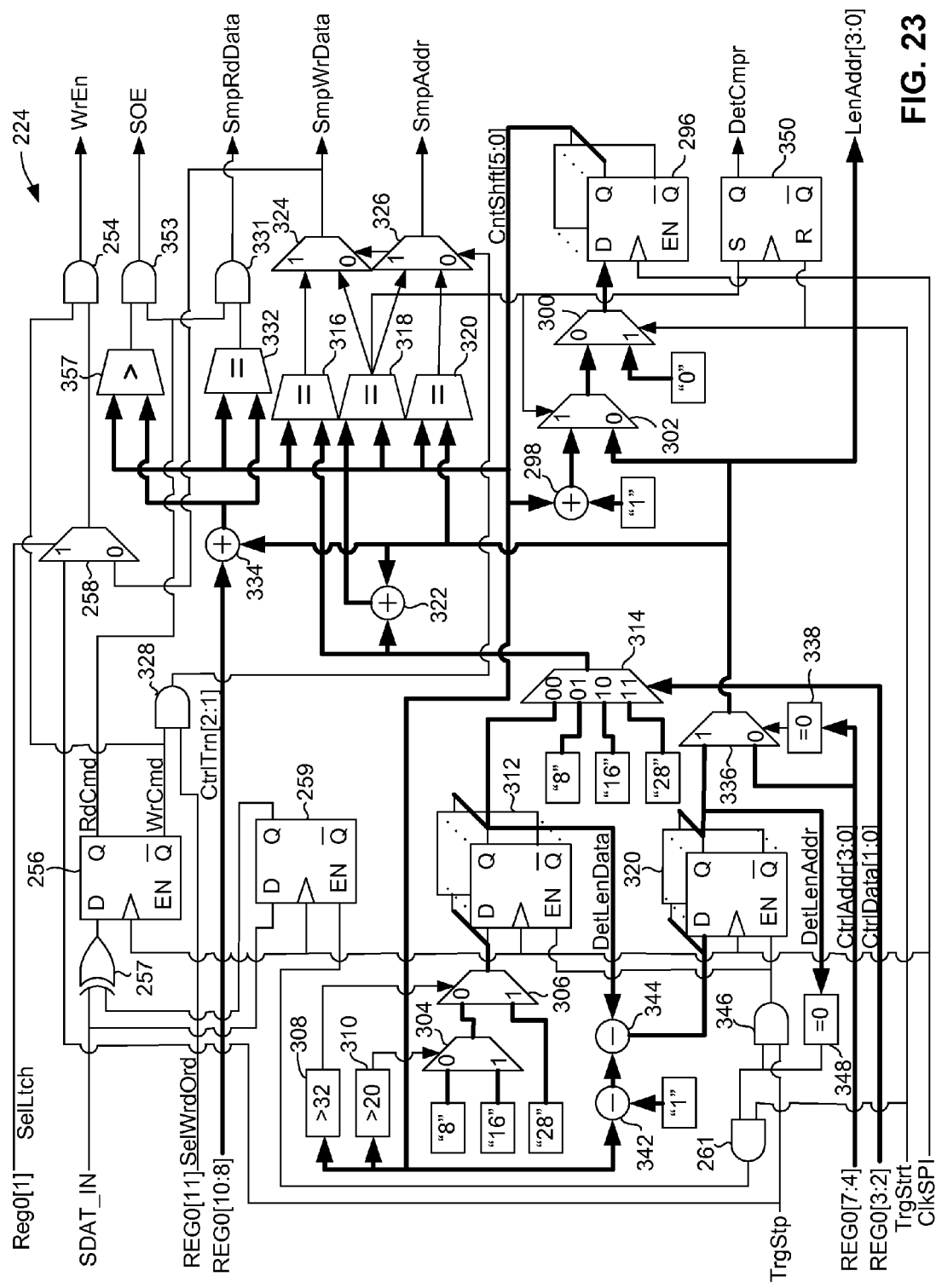
FIG. 23 is a block diagram of the shift controller of the SPI control logic of FIG. 20.

In FIG. 23, shift controller 224 (FIG. 20) is shown in further detail. One of the functions of shift controller 224 is to generate a write enable signal WrEn. The WrEn signal is generated by circuitry comprising an AND gate 254, a flip-flop 256 and a multiplexer 258, in response to TrgStrt and TrgStp, the latching mode indicated by a signal SelLtch that represents the contents of REG0[1], and the write data sample signal SmpWrData. Flip-flop 256 samples the first bit of the serial data input (SDAT_IN) when the trigger start signal TrgStrt is high. The read command signal WrCmd at the inverted (Q) output of flip-flop 256 is used to arm the write operation, as the first bit received is the Write/Read bit. A corresponding read command signal RdCmd is produced at the non-inverted (Q) output of flip-flop 256.

Also, during the first or initial data transfer operation that occurs following a reset, circuitry that includes an exclusive-OR gate 257, a flip-flop 259 and an AND gate 261 senses the polarity of the Write/Read bit, i.e., the first bit of the serial data input (SDAT_IN) that occurs when TrgStrt is high. That is, this circuitry senses one of two modes: a first mode in which a low Write/Read bit indicates a write operation and a high Write-Read bit indicates a read operation, and a second mode in which a high Write/Read bit indicates a read operation and a low Write/Read bit indicates a write operation. As the initial data transfer operation following a reset is presumed to be a write operation to a configuration register or other register, flip-flop 259 stores the state of the first bit of the serial data input (SDAT_IN) that occurs when TrgStrt is high.

The inverted output of flip-flop 256 (WrCmd) remains high throughout the entirety of each data transfer. The write enable signal WrEn is a pulse that is generated via AND gate 254 when either the trigger stop signal TrgStp is generated at the end of the data transfer or when the shift count times out. The timeout of the shift count is indicated by the sample write data signal SmpWrData. The latch select signal SelLtch, which represents the contents of REG0[1], controls whether multiplexer 258 selects the trigger stop signal TrgStp or the sample write data signal SmpWrData as the basis for generating the write enable signal WrEn.

Another one of the functions of shift controller 224 is to determine the number of address bits, i.e., the address length, DetLenAddr, and data bits, i.e., the data length DetLenData. A flip-flop array (i.e., register) 296 maintains the shift count ("CntShft[5:0]"). An adder 298 increments the count on each cycle of the clock signal ClkSPI. A multiplexer 300 selects a value of zero for loading into flip-flop array 296 when TrgStrt is in a high state. When TrgStrt is in a low state, multiplexer 300 selects the output of another multiplexer 302, which selects the address length when the shift count reaches the sum of the address length and data length. Logic elements that include two multiplexers 304 and 306 and two comparators 308 and 310 determine whether the number of data bits, i.e., the data length, DetLenData, is 8, 16 or 28. As described above, when a value of "0" is stored in REG0[3:2], a dynamic or on-the-fly selection of DetLenData is made in response to CntShft. Multiplexers 304 and 306 and comparators 308 and 310 produce an output of 28 if CntShft is greater than 32, an output of 16 if CntShft is greater than 20 but less than 32, and an output of eight if CntShft is less than 20. This output, DetLenData, is clocked into a flip-flop array (i.e., register) 312. The data length mode, as indicated by the signal CtrlData [1:0] that represents the contents of REG0[3:2] controls a multiplexer 314. If CtrlData[1:0] is "0," indicating that the data length is to be determined dynamically, multiplexer 314 selects DetLenData stored in flip-flop array 312. However, if CtrlData[1:0] is "1," indicating that the data length is to be set to a value of eight, multiplexer 314 selects and outputs a value of eight. Likewise, if CtrlData[1:0] is "2," indicating that the data length is to be set to a value of 16, multiplexer 314 selects and outputs a value of 16. Similarly, if CtrlData[1:0] is "3," indicating that the data length is to be set to a value of 28, multiplexer 314 selects and outputs a value of 28. The output of multiplexer 314 is provided to logic circuitry that includes four comparators 316, 318 and 320, an adder 322, and two multiplexers 324 and 326, which generates the sample write data signal SmpWrData and sample read data signal SmpRdData. This logic also receives as inputs, via an AND gate 328, the write command signal WrCmd and the word order mode as indicated by SelWrdOrd that represents the contents of REG0[11]. The sample read data signal SmpRdData is generated by an AND gate 331 that receives RdEn and the output of another comparator 332. An adder 334 sums the address length LenAddr[3:0] with the turnaround length, which is indicated by the signal CtrlTrn[2:1] that represents the contents of REG0[10:9]. Comparator 332 compares this sum with CntShft. If CntShft equals this sum while RdCmd is in a high state, then AND gate 331 asserts the SmpRdData signal.

A multiplexer 336 selects and outputs the address length LenAddr[3:0] in response to the address length mode, which is indicated by the signal CtrlAddr[3:0] that represents the contents of REG0[7:4]. If CtrlAddr[3:0] has a non-zero value as determined by a comparator 338, then multiplexer 336 selects and outputs the contents of REG0[7:4]. If CtrlAddr[3:0] has a value of zero, then multiplexer 336 selects and outputs the contents of the flip-flop array (i.e., register) 320 in which DetLenAddr is stored. DetLenAddr is formed by two subtractors 342 and 344 that compute the quantity ShftCnt−DetLenData−1. An AND gate 346 and a comparator 348 ensure that flip-flop arrays 320 and 312 are disabled after DetLenAddr is sampled after the first data transfer.

A set-reset flip-flop 350 outputs a DetCmpr signal when a compressed mode write operation is detected. Flip-flop 350 is set when the shift count reaches the sum of LenAddr and LenData, as indicated by the output of comparator 318. Flip-flop 350 is reset before every data transfer, as indicated by the start trigger signal TrgStrt.

Still another one of the functions of shift controller 224 is to generate the serial output enable SOE signal. Circuitry for generating the SOE signal includes a comparator 357 and an AND gate 353. The AND gate 353 receives SOE signal is generated by an AND gate 331 that receives RdCmd and the output of comparator 357. As described above, adder 334 sums the address length LenAddr[3:0] and the turnaround length. Comparator 351 compares this sum with CntShft. If CntShft is greater than this sum while RdCmd is in a high state, then AND gate 353 asserts SOE.

Figure 24:
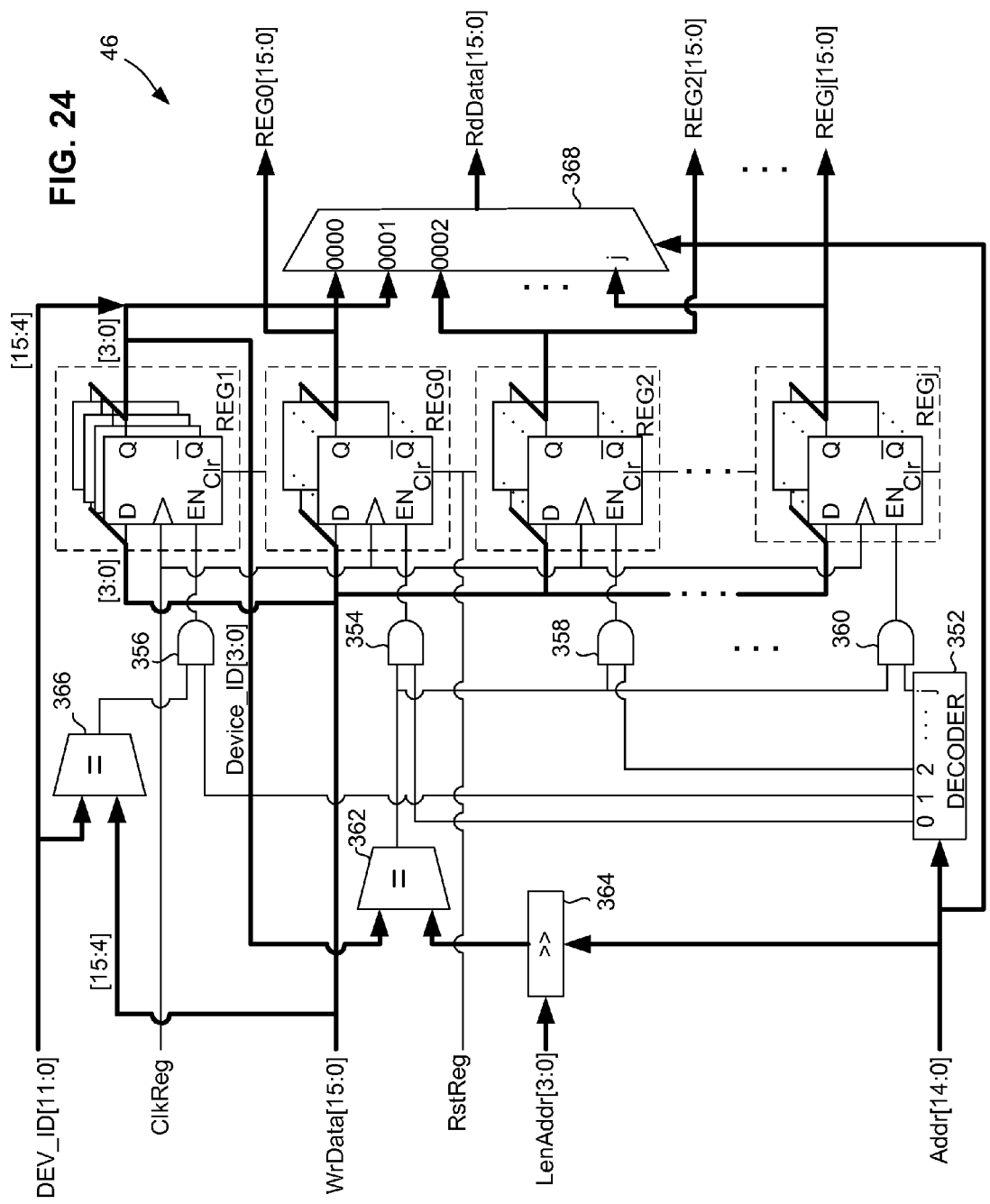
FIG. 24 is a block diagram of the register bank of the SPI system of FIG. 9.

In FIG. 24, register bank 46 (FIG. 9) is shown in further detail. Register bank 46 includes a number (j+1) of registers, referred to herein as REG0, REG1, REG2, etc., through REGj (with registers not shown for purposes of clarity being indicated by the ellipsis (" . . . ") symbol). In the exemplary embodiment, registers REG2 through REGj are those that SPI master controller 44 can write to or read from for the purpose of controlling the operation of logic blocks 40, 42, etc., as described above with regard to FIG. 9. As also described above, in the exemplary embodiment REG0 is reserved as an interface configuration register, and REG1 is reserved as a device configuration register.

Register bank 46 also includes an address decoder 352, which decodes ADDR[14:0] and outputs signals that are gated through AND gates 354, 356, 358, 360, etc., to the Enable inputs of REG0 through REGj. The output of a comparator 362 is provided to the other input of each of AND gates 354, 358 and 360. Comparator 362 determines if the least-significant four bits of REG1, which represent the soft device ID, match the most-significant four bits of Addr[14:0]. A bit shifter 364 shifts Addr[14:0] by LenAddr bits to obtain the most-significant four bits of Addr[14:0]. Thus, REG0 and REG2 through REGj can only be written to or read from if Addr[14:0] properly addresses integrated circuit chip 36 (the "device" in this embodiment) using the soft device ID that integrated circuit chip 36 has been assigned, i.e., the soft device ID that SPI master controller 44 has caused to be stored in REG1[3:0]. Each of REG0 and REG2 through REGj can latch or store WrData[15:0] in response to a register clock signal ClkReg. Another comparator 366 determines if the hard device ID, DEV_ID[11:0], matches the most-significant bits of WrData[15:0] and, if they match, provide the other input to AND gate 356 that is needed to enable REG1. A multiplexer 368 that outputs RdData[15:0] operates in response to Addr[14:0] to select the output of one of REG0 through REGj.

Figure 25:
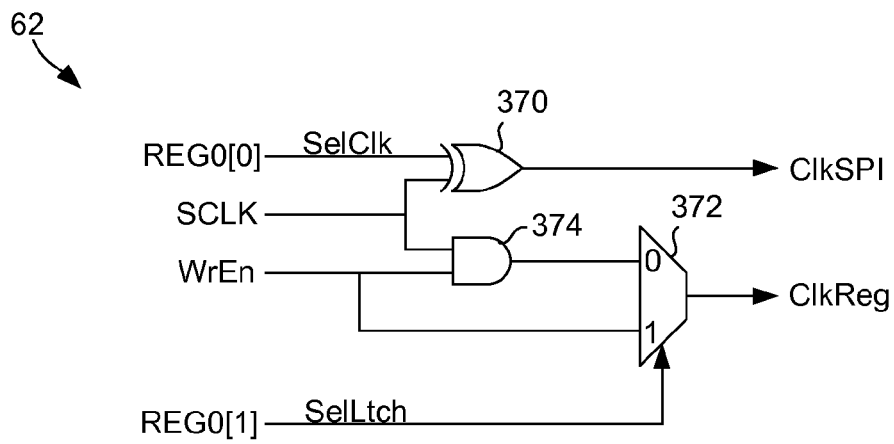
FIG. 25 is a block diagram of the clock generator of the SPI system of FIG. 9.

In FIG. 25, clock generator 62 (FIG. 9) is shown in further detail. Clock generator 62 includes an exclusive-OR gate that outputs ClkSPI in response to the SPI clock signal SCLK and the clock edge select mode, which is indicated by the signal SelClk that represents the contents of REG0[0]. Clock generator 62 also includes a multiplexer 372 that outputs ClkReg. Multiplexer 372 operates in response to the latching mode, which is indicated by the signal SelLtch that represents the contents of REG0[1]. If SelLtch is "1," multiplexer 372 selects the write enable signal EnWr. If SelLtch is "0," multiplexer 372 selects the output of an AND gate 374 that forms the logical-AND of EnWr and SCLK.

Figure 26:
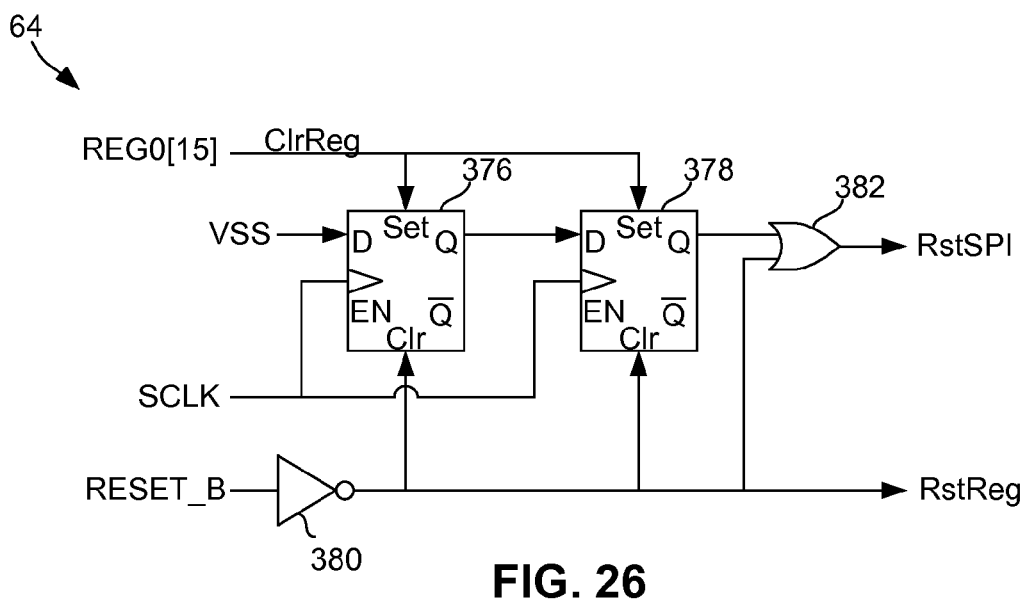
FIG. 26 is a block diagram of the reset generator of the SPI system of FIG. 9.

In FIG. 26, reset generator 64 (FIG. 9) is shown in further detail. Reset generator 64 includes Reset generator 64 includes two cascaded flip-flops 376 and 378 that are clocked by SCLK. The D input of the first flip-flop 376 in the cascade is connected to a fixed voltage, VSS, representing a logic-"1" or high state. The Set inputs of flip-flops 376 and 378 receive the soft reset indicator, indicated by the signal ClrReg that represents the contents of REG0[15]. Thus, if SPI master controller 44 (FIG. 9) can cause a soft reset to occur by writing a "1" to REG0[15]. The Clear inputs of flip-flops 376 and 378 are cleared by the hard reset signal RESET_B via an inverter 380. Inverter 380 also outputs RstReg, which is the complement of RESET_B. An OR gate 382 produces RstSPI in response to the output of flip-flop 378 and RstReg.

Although an exemplary embodiment of the invention is described above for purposes of clarity in terms of configurations or arrangements of gate-level logic elements, it should be understood that embodiments of the invention can be structured in any suitable manner. For example, the logic elements can comprise programmable elements of an application-specific integrated circuit (ASIC), field-programmable gate array (FPGA), or other programmable device.

While various embodiments of the invention have been described, it will be apparent to those of ordinary skill in the art that many more embodiments are possible that are within the scope of this invention. Accordingly, the invention is not to be restricted except in light of the following claims.

What is claimed is:

1. A method for controlling a serial peripheral interface, comprising:
   monitoring serial peripheral interface signal lines including a data signal line, a clock signal line, and a select signal line;
   detecting a plurality of clock signal transitions on the clock signal line;
   detecting a plurality of data signal transitions on the data signal line in synchronism with clock signal transitions;
   detecting initiation of one of a data read and data write operation in accordance with a first protocol in response to a first combination of one or more signals on one or more of the data signal line, the clock signal line, and the select signal line; and
   detecting initiation of one of a data read and data write operation in accordance with a second protocol in response to a second combination of one or more signals on one or more of the data signal line, the clock signal line, and the select signal line;

performing a data read operation upon a register identified by address bits received serially on the data signal line following detection of the initiation of a data read operation; and performing a data write operation upon a register identified by address bits received serially on the data signal line following detection of the initiation of a data write operation.

2. The method claimed in claim 1, wherein detecting initiation of one of a data read and data write operation in accordance with a first protocol comprises:
detecting a transition of a select signal on the select signal line from a low state to a high state; and
detecting a plurality of clock signal transitions while the select signal is in the high state immediately following detection of the transition of the select signal from a low state to a high state.

3. The method claimed in claim 1, wherein detecting initiation of one of a data read and data write operation in accordance with a first protocol comprises:
detecting a transition of a select signal on the select signal line from a high state to a low state; and
detecting a plurality of clock signal transitions while the select signal is in the low state immediately following detection of the transition of the select signal from a high state to a low state.

4. The method claimed in claim 1, wherein detecting initiation of one of a data read and data write operation in accordance with a first protocol comprises:
detecting a transition of a data signal on the data signal line from a high state to a low state while substantially simultaneously detecting a clock signal on the clock signal line in a high state.

5. The method claimed in claim 1, wherein:
detecting initiation of one of a data read and data write operation in accordance with a first protocol comprises:
detecting a transition of a select signal on the select signal line; and
detecting a plurality of clock signal transitions immediately following
detection of the transition of the select signal; and
detecting initiation of one of a data read and data write operation in accordance with a second protocol comprises detecting a transition of a data signal on the data signal line from a high state to a low state while substantially simultaneously detecting a clock signal on the clock signal line in a high state.

6. The method claimed in claim 1, further comprising:
in response to detecting initiation of a data write operation, counting a number of clock cycles occurring during the data write operation;
determining a number A of address bits in response to a count C of the number of clock cycles occurring during the data write operation;
determining a difference C-A between the count of the number of clock cycles occurring during the data write operation and the number A of address bits;
determining a number D of data bits in response to the difference C-A; and
wherein performing a data write operation includes storing in the register D data bits received serially on the data signal line following A address bits received serially on the data signal line.

7. The method claimed in claim 1, wherein:
performing a data write operation comprises performing a data write operation on a configuration register identified by the address bits, the data write operation including storing in the configuration register data bits received serially on the data signal line following address bits received serially on the data signal line;
at least one of the data bits stored in the configuration register is an address length mode bit; and
the method further comprises, after performing the data write operation on the configuration register, performing a further data write operation, the further data write operation including storing in a register data bits received serially on the data signal line following a first number of address bits received serially on the data signal line if the address length mode bit stored in the configuration register is a first binary value, and storing in the register data bits received serially on the data signal line following a second number of address bits received serially on the data signal line if the address length mode bit stored in the configuration register is a second binary value.

8. The method claimed in claim 1, wherein:
performing a data write operation comprises performing a data write operation on a configuration register identified by the address bits, the data write operation including storing in the configuration register data bits received serially on the data signal line following address bits received serially on the data signal line;
at least one of the data bits stored in the configuration register is a data length mode bit; and
the method further comprises, after performing the data write operation on the configuration register, performing a further data write operation, the further data write operation including storing in a register a first number of data bits received serially on the data signal line if the data length mode bit stored in the configuration register is a first binary value, and storing in the register a second number of data bits received serially on the data signal line if the address length mode bit stored in the configuration register is a second binary value.

9. The method claimed in claim 1, wherein:
performing a data write operation comprises performing a data write operation on a configuration register identified by the address bits, the data write operation including storing in the configuration register data bits received serially on the data signal line following address bits received serially on the data signal line;
one of the data bits stored in the configuration register is a clock edge mode bit; and
the method further comprises, after performing the data write operation on the configuration register, performing a further data write operation, the further data write operation including shifting each of a plurality of data bits received serially on the data signal line into a shift register on a rising clock signal edge if the clock edge mode bit stored in the configuration register is a first binary value, and shifting each of the plurality of data bits received serially on the data signal line into the shift register on a falling clock signal edge if the clock edge mode bit stored in the configuration register is a second binary value.

10. The method claimed in claim 1, wherein:
performing a data write operation comprises performing a data write operation on a configuration register identified by the address bits, the data write operation including storing in the configuration register data bits received serially on the data signal line following address bits received serially on the data signal line;
one of the data bits stored in the configuration register is a latch mode bit; and the method further comprises, after performing the data write operation on the configuration register, performing a further data write operation upon a register, the further data write operation including:
   shifting each of a plurality of data bits received serially on the data signal line into a shift register;
   latching contents of the shift register into the register in response to a transition of the select signal if the sampling latch mode bit stored in the configuration register is a first binary value, and latching contents of the shift register into the register in response to a count of the number of data bits shifted into the shift register if the sampling latch mode bit stored in the configuration register is a second binary value.

11. The method claimed in claim 1, wherein:
performing a data write operation comprises performing a data write operation on a configuration register identified by the address bits, the data write operation including storing in the configuration register data bits received serially on the data signal line following address bits received serially on the data signal line;
one of the data bits stored in the configuration register is a bit order mode bit; and
the method further comprises, after performing the data write operation on the configuration register, performing a further data write operation upon a register, the further data write operation including:
   shifting each of a plurality of data bits received serially on the data signal line into a shift register;
   latching contents of the shift register into the register in an order from most-significant bit to least-significant bit if the bit order mode bit stored in the configuration register is a first binary value, and latching contents of the shift register into the register in an order from least-significant bit to most-significant bit if the bit order mode bit stored in the configuration register is a second binary value.

12. The method claimed in claim 1, wherein:
performing a data write operation comprises performing a data write operation on a configuration register identified by the address bits, the data write operation including storing in the configuration register data bits received serially on the data signal line following address bits received serially on the data signal line;
at least one of the data bits stored in the configuration register is a word order mode bit; and
the method further comprises, after performing the data write operation on the configuration register, performing a further data write operation, the further data write operation including storing in a register data bits received serially on the data signal line following address bits received serially on the data signal line if the word order mode bit stored in the configuration register is a first binary value, and storing in the register data bits received serially on the data signal line preceding address bits received serially on the data signal line if the word order mode bit stored in the configuration register is a second binary value.

13. The method claimed in claim 1, wherein:
performing a data write operation comprises performing a data write operation on a configuration register identified by the address bits, the data write operation including storing in the configuration register data bits received serially on the data signal line following address bits received serially on the data signal line;
at least one of the data bits stored in the configuration register is a turnaround length mode bit; and the method further comprises, after performing the data write operation on the configuration register, performing a further data read operation upon a register, the further data read operation including:
   receiving address bits serially on the data signal line;
   reading data from a register identified by the address bits; and
   if the turnaround length mode bit stored in the configuration register is a first binary value then beginning to serially transmit data bits read from the register on the data signal line after a delay of a first number of clock cycles after the last address bit received, and if the turnaround length mode bit stored in the configuration register is a second binary value then beginning to serially transmit data bits read from the register on the data signal line after a delay of a second number of clock cycles after the last address bit received.

14. The method claimed in claim 1, wherein:
performing a data write operation comprises performing a data write operation on a configuration register identified by the address bits, the data write operation including storing in the configuration register data bits received serially on the data signal line following address bits received serially on the data signal line;
at least one of the data bits stored in the configuration register is a soft reset bit; and
applying a reset signal to a plurality of logic elements if the soft reset mode bit stored in the configuration register is a first binary value, and not applying the reset signal to the plurality of logic elements if the soft reset bit stored in the configuration register is a second binary value.

15. The method claimed in claim 1, wherein performing a data write operation comprises:
detecting an indication of termination of the data write operation upon the register identified by the address bits in accordance with one of the first protocol and the second protocol in response to one or more signals on one or more of the data signal line, the clock signal line, and the select signal line; and
if no indication of termination of the data write operation is detected after a number D of data bits associated with the data write operation and received serially on the data signal line have been written to the register identified by the address bits, then performing a further data write operation upon a next register identified by a next address following an address corresponding to the address bits, the further data write operation including storing in the next register a next group of D data bits received serially on the data signal line immediately following a previous group of D data bits received serially on the data signal line.

16. The method claimed in claim 1, further comprising:
entering a reset state in response to a detection of a reset condition;
before performing a data read operation and after entering the reset state, detecting whether a Write/Read bit received on the data signal line in an initial data write operation is high or low;
if the Write/Read bit received in the initial write operation is high, performing a further data write operation only if a Write/Read bit detected in a data transfer operation subsequent to the initial write operation is high, and performing a data read operation only if a Write/Read bit detected in the data transfer operation is low; and
if the Write/Read bit received in the initial write operation is high, performing a further data write operation only if a Write/Read bit detected in a data transfer operation subsequent to the initial write operation is low, and performing a data read operation only if a Write/Read bit detected in the data transfer operation is high.

17. A serial peripheral interface controller connectable to a data signal line, a clock signal line, and a select signal line, comprising:
a register bank, the register bank having a plurality of data storage registers; and
control logic programmed or configured to:
detect a plurality of bit transitions on the data signal line in synchronism with clock signal transitions;
detect initiation of one of a data read and data write operation in accordance with a first protocol in response to a first combination of one or more signals on one or more of the data signal line, the clock signal line, and the select signal line; and
detect initiation of one of a data read and data write operation in accordance with a second protocol in response to a second combination of one or more signals on one or more of the data signal line, the clock signal line, and the select signal line;
perform a data read operation upon a register of the register bank identified by address bits received serially on the data signal line following detection of the beginning of a data read operation; and
perform a data write operation upon a register of the register bank identified by address bits received serially on the data signal line following detection of the beginning of a data write operation.

18. The serial peripheral interface controller claimed in claim 17, wherein the control logic is programmed or configured to detect initiation of one of a data read and data write operation in accordance with a first protocol by being programmed or configured to:
detect a transition of a select signal on the select signal line from a low state to a high state; and
detect a plurality of clock signal transitions while the select signal is in the high state immediately following detection of the transition of the select signal from a low state to a high state.

19. The serial peripheral interface controller claimed in claim 17, wherein the control logic is programmed or configured to detect initiation of one of a data read and data write operation in accordance with a first protocol by being programmed or configured to:
detect a transition of a select signal on the select signal line from a high state to a low state; and
detect a plurality of clock signal transitions while the select signal is in the low state immediately following detection of the transition of the select signal from a high state to a low state.

20. The serial peripheral interface controller claimed in claim 17, wherein the control logic is programmed or configured to detect initiation of one of a data read and data write operation in accordance with a first protocol by being programmed or configured to:
detect a transition of a data signal on the data signal line from a high state to a low state while substantially simultaneously detecting a clock signal on the clock signal line in a high state.

21. The serial peripheral interface controller claimed in claim 17, wherein:
the control logic is programmed or configured to detect initiation of one of a data read and data write operation in accordance with a first protocol by being programmed or configured to:
detect a transition of a select signal on the select signal line; and
detect a plurality of clock signal transitions immediately following
detection of the transition of the select signal; and
the control logic is programmed or configured to detect initiation of one of a data read and data write operation in accordance with a second protocol by being programmed or configured to detect a transition of a data signal on the data signal line from a high state to a low state while substantially simultaneously detecting a clock signal on the clock signal line in a high state.

22. The serial peripheral interface controller claimed in claim 17, wherein the control logic is further programmed or configured to:
in response to detecting initiation of a data write operation, count a number of clock cycles occurring during the data write operation;
determine a number A of address bits in response to a count C of the number of clock cycles occurring during the data write operation;
determine a difference C-A between the count of the number of clock cycles occurring during the data write operation and the number A of address bits; determine a number D of data bits in response to the difference C-A; and
wherein the control logic is programmed or configured to perform a data write operation by storing in the register D data bits received serially on the data signal line following A address bits received serially on the data signal line.

23. The serial peripheral interface controller claimed in claim 17, wherein:
the control logic is programmed or configured to perform a data write operation by being programmed or configured to perform a data write operation on a configuration register identified by the address bits, the data write operation including storing in the configuration register data bits received serially on the data signal line following address bits received serially on the data signal line;
at least one of the data bits stored in the configuration register is an address length mode bit; and
the control logic is further programmed or configured to, after the data write operation is performed on the configuration register, perform a further data write operation, the further data write operation including storing in a register data bits received serially on the data signal line following a first number of address bits received serially on the data signal line if the address length mode bit stored in the configuration register is a first binary value, and storing in the register data bits received serially on the data signal line following a second number of address bits received serially on the data signal line if the address length mode bit stored in the configuration register is a second binary value.

24. The serial peripheral interface controller claimed in claim 17, wherein:
the control logic is programmed or configured to perform a data write operation by being programmed or configured to perform a data write operation on a configuration register identified by the address bits, the data write operation including storing in the configuration register data bits received serially on the data signal line following address bits received serially on the data signal line;
at least one of the data bits stored in the configuration register is a data length mode bit; and the control logic is further programmed or configured to, after the data write operation is performed on the configuration register, perform a further data write operation, the further data write operation including storing in a register a first number of data bits received serially on the data signal line if the data length mode bit stored in the configuration register is a first binary value, and storing in the register a second number of data bits received serially on the data signal line if the address length mode bit stored in the configuration register is a second binary value.

25. The serial peripheral interface controller claimed in claim 17, wherein:
    the control logic is programmed or configured to perform a data write operation by being programmed or configured to perform a data write operation on a configuration register identified by the address bits, the data write operation including storing in the configuration register data bits received serially on the data signal line following address bits received serially on the data signal line;
    one of the data bits stored in the configuration register is a clock edge mode bit; and
    the control logic is further programmed or configured to, after the data write operation is performed on the configuration register, perform a further data write operation, the further data write operation including shifting each of a plurality of data bits received serially on the data signal line into a shift register on a rising clock signal edge if the clock edge mode bit stored in the configuration register is a first binary value, and shifting each of the plurality of data bits received serially on the data signal line into the shift register on a falling clock signal edge if the clock edge mode bit stored in the configuration register is a second binary value.

26. The serial peripheral interface controller claimed in claim 17, wherein:
    the control logic is programmed or configured to performing a data write operation by being programmed or configured to perform a data write operation on a configuration register identified by the address bits, the data write operation including storing in the configuration register data bits received serially on the data signal line following address bits received serially on the data signal line;
    one of the data bits stored in the configuration register is a latch mode bit; and
    the control logic is further programmed or configured to, after the data write operation is performed on the configuration register, performing a further data write operation upon a register, the further data write operation including:
        shifting each of a plurality of data bits received serially on the data signal line into a shift register;
        latching contents of the shift register into the register in response to a transition of the select signal if the sampling latch mode bit stored in the configuration register is a first binary value, and latching contents of the shift register into the register in response to a count of the number of data bits shifted into the shift register if the sampling latch mode bit stored in the configuration register is a second binary value.

27. The serial peripheral interface controller claimed in claim 17, wherein:
    the control logic is programmed or configured to performing a data write operation by being programmed or configured to perform a data write operation on a configuration register identified by the address bits, the data write operation including storing in the configuration register data bits received serially on the data signal line following address bits received serially on the data signal line;
    one of the data bits stored in the configuration register is a bit order mode bit; and
    the control logic is further programmed or configured to, after the data write operation is performed on the configuration register, perform a further data write operation upon a register, the further data write operation including:
        shifting each of a plurality of data bits received serially on the data signal line into a shift register;
        latching contents of the shift register into the register in an order from most-significant bit to least-significant bit if the bit order mode bit stored in the configuration register is a first binary value, and latching contents of the shift register into the register in an order from least-significant bit to most-significant bit if the bit order mode bit stored in the configuration register is a second binary value.

28. The serial peripheral interface controller claimed in claim 17, wherein:
    the control logic is programmed or configured to perform a data write operation by being programmed or configured to perform a data write operation on a configuration register identified by the address bits, the data write operation including storing in the configuration register data bits received serially on the data signal line following address bits received serially on the data signal line;
    at least one of the data bits stored in the configuration register is a word order mode bit; and
    the control logic is further programmed or configured to, after the data write operation is performed on the configuration register, perform a further data write operation, the further data write operation including storing in a register data bits received serially on the data signal line following address bits received serially on the data signal line if the word order mode bit stored in the configuration register is a first binary value, and storing in the register data bits received serially on the data signal line preceding address bits received serially on the data signal line if the word order mode bit stored in the configuration register is a second binary value.

29. The serial peripheral interface controller claimed in claim 17, wherein:
    the control logic is programmed or configured to perform a data write operation by being programmed or configured to perform a data write operation on a configuration register identified by the address bits, the data write operation including storing in the configuration register data bits received serially on the data signal line following address bits received serially on the data signal line;
    at least one of the data bits stored in the configuration register is a turnaround length mode bit; and
    the control logic is further programmed or configured to, after the data write operation is performed on the configuration register, perform a further data read operation upon a register, the further data read operation including:
        receiving address bits serially on the data signal line;
        reading data from a register identified by the address bits; and
        if the turnaround length mode bit stored in the configuration register is a first binary value then beginning to serially transmit data bits read from the register on the data signal line after a delay of a first number of clock cycles after the last address bit received, and if the turnaround length mode bit stored in the configuration register is a second binary value then beginning to serially transmit data bits read from the register on the data signal line after a delay of a second number of clock cycles after the last address bit received.

30. The serial peripheral interface controller claimed in claim 17, wherein:

the control logic is programmed or configured to perform a data write operation by being programmed or configured to perform a data write operation on a configuration register identified by the address bits, the data write operation including storing in the configuration register data bits received serially on the data signal line following address bits received serially on the data signal line;

at least one of the data bits stored in the configuration register is a soft reset bit; and the control logic is further programmed or configured to apply a reset signal to a plurality of logic elements if the soft reset mode bit stored in the configuration register is a first binary value, and not apply the reset signal to the plurality of logic elements if the soft reset bit stored in the configuration register is a second binary value.

31. The serial peripheral interface controller claimed in claim 17, wherein the control logic is programmed or configured to perform a data write operation by being programmed or configured to:

detect an indication of termination of the data write operation upon the register identified by the address bits in accordance with one of the first protocol and the second protocol in response to one or more signals on one or more of the data signal line, the clock signal line, and the select signal line; and if no indication of termination of the data write operation is detected after a number D of data bits associated with the data write operation and received serially on the data signal line have been written to the register identified by the address bits, then perform a further data write operation upon a next register identified by a next address following an address corresponding to the address bits, the further data write operation including storing in the next register a next group of D data bits received serially on the data signal line immediately following a previous group of D data bits received serially on the data signal line.

32. The serial peripheral interface controller claimed in claim 17, wherein the control logic is further programmed or configured to:

apply a reset signal to a plurality of logic elements in response to a detection of a reset condition;

before a data read operation is performed after the reset signal is applied, detect whether a Write/Read bit received on the data signal line in an initial data write operation is high or low;

if the Write/Read bit received in the initial write operation is high, perform a further data write operation only if a Write/Read bit detected in a data transfer operation subsequent to the initial write operation is high, and perform a data read operation only if a Write/Read bit detected in the data transfer operation is low; and if the Write/Read bit received in the initial write operation is high, perform a further data write operation only if a Write/Read bit detected in a data transfer operation subsequent to the initial write operation is low, and perform a data read operation only if a Write/Read bit detected in the data transfer operation is high.

* * * * *